(12) United States Patent
Chi et al.

(10) Patent No.: US 11,531,380 B2
(45) Date of Patent: Dec. 20, 2022

(54) ELECTRONIC DEVICE

(71) Applicants: Cheng-Ya Chi, Taipei (TW);
Chien-Chu Chen, Taipei (TW);
Ken-Ping Lin, Taipei (TW);
Cheng-Shiue Jan, Taipei (TW);
Yao-Lin Chang, Taipei (TW);
Han-Hsuan Tsai, Taipei (TW); Jui-Min Huang, Taipei (TW); Chih-Wen Chiang, Taipei (TW)

(72) Inventors: Cheng-Ya Chi, Taipei (TW);
Chien-Chu Chen, Taipei (TW);
Ken-Ping Lin, Taipei (TW);
Cheng-Shiue Jan, Taipei (TW);
Yao-Lin Chang, Taipei (TW);
Han-Hsuan Tsai, Taipei (TW); Jui-Min Huang, Taipei (TW); Chih-Wen Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 120 days.

(21) Appl. No.: 16/997,915

(22) Filed: Aug. 19, 2020

(65) Prior Publication Data
US 2021/0055764 A1 Feb. 25, 2021

Related U.S. Application Data

(60) Provisional application No. 62/889,543, filed on Aug. 20, 2019.

(51) Int. Cl.
*G06F 1/16* (2006.01)

(52) U.S. Cl.
CPC .................................. *G06F 1/1681* (2013.01)

(58) Field of Classification Search
CPC .... G06F 1/1681; G06F 1/1647; G06F 1/1616; F16C 11/04
See application file for complete search history.

(56) References Cited

U.S. PATENT DOCUMENTS 9,173,287 B1 * 10/2015 Kim .................... G06F 1/1681
9,304,549 B2 * 4/2016 Siddiqui ............... G06F 1/1679
(Continued)

FOREIGN PATENT DOCUMENTS

CN             206309759             7/2017

OTHER PUBLICATIONS

"Office Action of China Counterpart Application", dated Jun. 23, 2021, p. 1-p. 7.

*Primary Examiner* — Anthony M Haughton
*Assistant Examiner* — Theron S Milliser
(74) *Attorney, Agent, or Firm* — JCIPRNET

(57) ABSTRACT

An electronic device including two bodies and at least one hinge structure is provided. The hinge structure includes a first bracket, a second bracket, a first rotation component, and a second rotation component. The hinge structure is connected to the two bodies via the first bracket and the second bracket respectively. The first rotation component is connected rotatably to the first bracket by taking a first axis as a rotation axis. The second rotation component is connected rotatably to the first rotation component by taking the first axis as a rotation axis, and is connected rotatably to the second bracket by taking a second axis as a rotation axis, wherein the first axis and the second axis are parallel to each other.

19 Claims, 25 Drawing Sheets

(56) References Cited

U.S. PATENT DOCUMENTS

| | | | | |
|---|---|---|---|---|
| 9,512,655 B2* | 12/2016 | Kuo | ............................ | E05D 1/04 |
| 9,801,290 B2* | 10/2017 | Ahn | ...................... | H05K 5/0226 |
| 9,823,706 B2* | 11/2017 | Chen | .......................... | E05D 3/02 |
| 10,001,815 B1* | 6/2018 | Yao | ........................ | H05K 5/0234 |
| 10,309,137 B2* | 6/2019 | Wu | .......................... | F16C 11/04 |
| 10,344,797 B2* | 7/2019 | Park | .......................... | G06F 1/166 |
| 10,732,679 B2* | 8/2020 | Wu | ........................ | G06F 1/1686 |
| 11,204,630 B2* | 12/2021 | Cho | ........................... | G06F 1/16 |
| 11,209,866 B2* | 12/2021 | Kuo | ........................ | G06F 1/1641 |
| 2014/0293534 A1* | 10/2014 | Siddiqui | ................ | G06F 1/1637 |
| | | | | 248/688 |
| 2016/0083989 A1* | 3/2016 | Kuo | .......................... | E05D 1/04 |
| | | | | 16/355 |
| 2016/0205792 A1* | 7/2016 | Ahn | ...................... | H05K 5/0017 |
| | | | | 40/779 |
| 2017/0257961 A1* | 9/2017 | Chen | ........................ | G06F 1/1681 |
| 2017/0284457 A1* | 10/2017 | Park | .......................... | H04M 1/04 |
| 2018/0335809 A1* | 11/2018 | Wu | .......................... | E05D 11/10 |
| 2020/0174530 A1* | 6/2020 | Wu | ........................ | G06F 1/1686 |
| 2021/0011523 A1* | 1/2021 | Kuo | ........................ | H04M 1/022 |
| 2021/0064084 A1* | 3/2021 | Lin | ........................ | G06F 1/1681 |
| 2021/0064097 A1* | 3/2021 | Cho | ........................ | G06F 1/1681 |

* cited by examiner

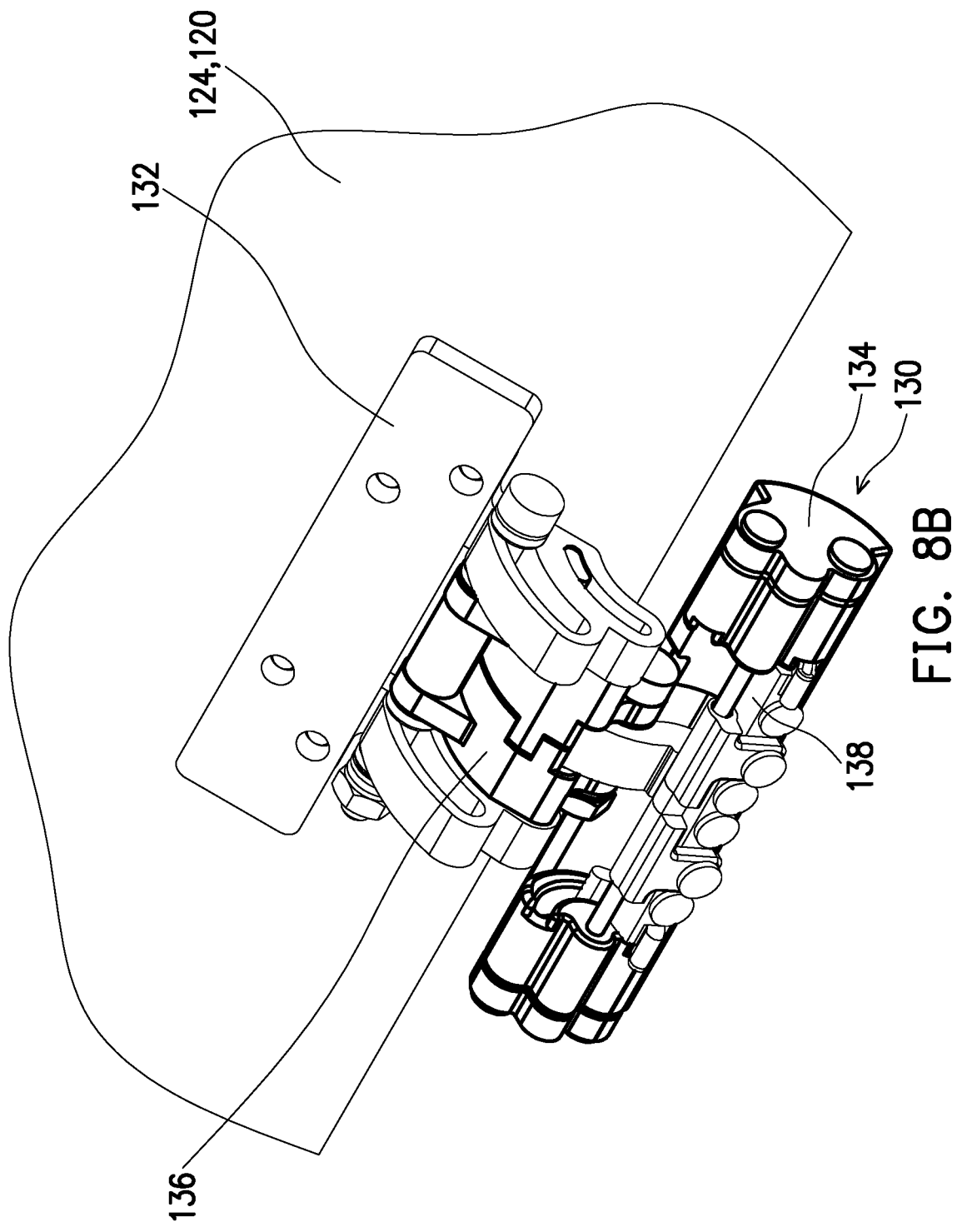

ELECTRONIC DEVICE

CROSS-REFERENCE TO RELATED APPLICATION

This application claims the priority benefit of U.S. application Ser. No. 62/889,543, filed on Aug. 20, 2019. The entirety of the above-mentioned patent application is hereby incorporated by reference herein and made a part of this specification.

BACKGROUND

Technical Field

The disclosure relates to an electronic device, and particularly to an electronic device including bodies which may rotate pivotally and relatively.

Description of Related Art

Along with the popularity and development of laptops, consumers also develop higher demands of convenience and versatility from the operation of laptops. In some laptops, both bodies are each provided with a display surface and are taking the form of dual screens. The two bodies may be flattened by rotating 180 degrees relative to each other, and the two bodies may also rotate 360 degrees relative to each other to be folded back into an operation mode of a tablet computer. However, while the general design of the hinge structure allows the two bodies to rotate 360 degrees relatively to each other, such design also prevents the two bodies from standing tightly against each other when the two bodies rotate 180 degrees relatively, making the two display surfaces become discontinuous. Alternatively, if the two bodies are designed to rotate 180 degrees relatively to each other such that they stand tightly against each other, the two bodies are prevented from rotating 360 degrees relatively.

SUMMARY

Accordingly, the disclosure provides an electronic device including two bodies which may stand tightly against each other when they rotate relatively to become flattened, and the two bodies may rotate further relatively and become reversely folded.

The electronic device of the disclosure includes the two bodies and at least one hinge structure. The hinge structure includes a first bracket, a second bracket, a first rotation component, and a second rotation component. The hinge structure is connected to the two bodies respectively via the first bracket and the second bracket. The first rotation component is connected rotatably to the first bracket by taking a first axis as a rotation axis. The second rotation component is connected rotatably to the first rotation component by taking the first axis as a rotation axis, and is connected rotatably to the second bracket by taking a second axis as a rotation axis, in which the first axis and the second axis are parallel to each other.

In an embodiment of the disclosure, the quantity of the hinge structure is two, the two first brackets of the two hinge structures are connected respectively to the two bodies, and the two second brackets of the two hinge structures are connected to each other.

In an embodiment of the disclosure, when the two bodies are closed, each of the first brackets is adapted to rotate relative to the corresponding first rotation component by taking the first axis as a rotation axis, such that the two bodies are unfolded relatively at a first angle, and then each of the first rotation components is adapted to rotate relative to the corresponding second rotation component by taking the first axis as a rotation axis, such that the two bodies are unfolded relatively at a second angle greater than the first angle, and then each of the second rotation components is adapted to rotate relative to the corresponding second bracket by taking the second axis as a rotation axis, such that the two bodies are unfolded relatively at a third angle greater than the second angle.

In an embodiment of the disclosure, the first angle is 90 degrees, the second angle is 180 degrees, and the third angle is 360 degrees.

In an embodiment of the disclosure, one of the first bracket and the first rotation component has an arc-shaped guide, and the center of curvature of the arc-shaped guide is located on the first axis. And the other one of the first bracket and the first rotation component has a convex part, and the convex part is disposed slidably to the arc-shaped guide.

In an embodiment of the disclosure, one of the first bracket and the first rotation component described above has another arc-shaped guide, and the center of curvature of the another arc-shaped guide is located on the first axis. And the other one of the first bracket and the first rotation component has another convex portion, and the another convex portion is disposed slidably to the arc-shaped guide.

In an embodiment of the disclosure, the two arc-shaped guides described above have different radii of curvature.

In an embodiment of the disclosure, the hinge structure described above includes at least one torque-providing element, and the at least one torque-providing element is connected coaxially to the convex portion.

In an embodiment of the disclosure, one of the first rotation component and the second rotation component described above has an arc-shaped guide, and the center of curvature of the arc-shaped guide is located on the first axis. And the other one of the first rotation component and the second rotation component has a convex portion, and the convex portion is disposed slidably to the arc-shaped guide.

In an embodiment of the disclosure, one of the first rotation component and the second rotation component described above has another arc-shaped guide, and the center of curvature of the another arc-shaped guide is located on the first axis. And the other one of the first rotation component and the second rotation component has another convex portion, and the another convex portion is disposed slidably to the another arc-shaped guide.

In an embodiment of the disclosure, the two arc-shaped guides described above have different radii of curvature.

In an embodiment of the disclosure, the hinge structure described above includes at least one torque-providing element, and the at least one torque-providing element is connected coaxially to the convex portion.

In an embodiment of the disclosure, one of the second rotation component and the second bracket described above has an arc-shaped guide, and the center of curvature of the arc-shaped guide is located on the second axis. And the other one of the second rotation component and the second bracket has a convex portion, and the convex portion is disposed slidably to the arc-shaped guide.

In an embodiment of the disclosure, one of the second rotation component and the second bracket described above has another arc-shaped guide, and the center of curvature of the another arc-shaped guide is located on the second axis. And the other one of the second rotation component and the second bracket has another convex portion, and the another convex portion is disposed slidably to the another arc-shaped guide.

In an embodiment of the disclosure, the two arc-shaped guides described above have the same radius of curvature and are connected to each other, the two arc-shaped guides each have different depths, and the two convex portions together form a ladder-shaped structure and may be disposed slidably respectively to the two arc-shaped guides.

In an embodiment of the disclosure, the arc-shaped guide having a less depth described above is divided into two sections, and the arc-shaped guide having a greater depth is connected between the two sections.

In an embodiment of the disclosure, an end of each of the sections described above is open.

In an embodiment of the disclosure, the hinge structure described above includes at least one torque-providing element, and the at least one torque-providing element is disposed on the second rotation component.

In an embodiment of the disclosure, the second bracket described above has a rod portion, and the rod portion extends along the second axis. And the at least one torque-providing element has a covering portion, and the covering portion covers the rod portion.

Based on the above, the hinge structure of the disclosure may drive the two bodies to rotate relatively until they are flattened and stand tightly against each other by rotating the first bracket relative to the first rotation component along the first axis and rotating the second rotation component relative to the first rotation component along the first axis. When the two bodies are flattened and stand tightly against each other, the two bodies cannot continue to rotate along the first axis due to structural interference. In light of this, the disclosure designs the two bodies to rotate smoothly relative to each other and become reversely folded via the second rotation component rotating relative to the second bracket along the second axis which is different from the first axis. In other words, the design of the disclosure not only allows the two bodies to stand tightly against each other when flattened but also allows the two bodies to rotate further to be reversely folded, fitting even more to the user's need in terms of operation.

BRIEF DESCRIPTION OF THE DRAWINGS

FIG. 8A to FIG. 8D are stereograms of part of components of the electronic device according to FIG. 7A to FIG. 7D.

DESCRIPTION OF THE EMBODIMENTS

Figure 1:
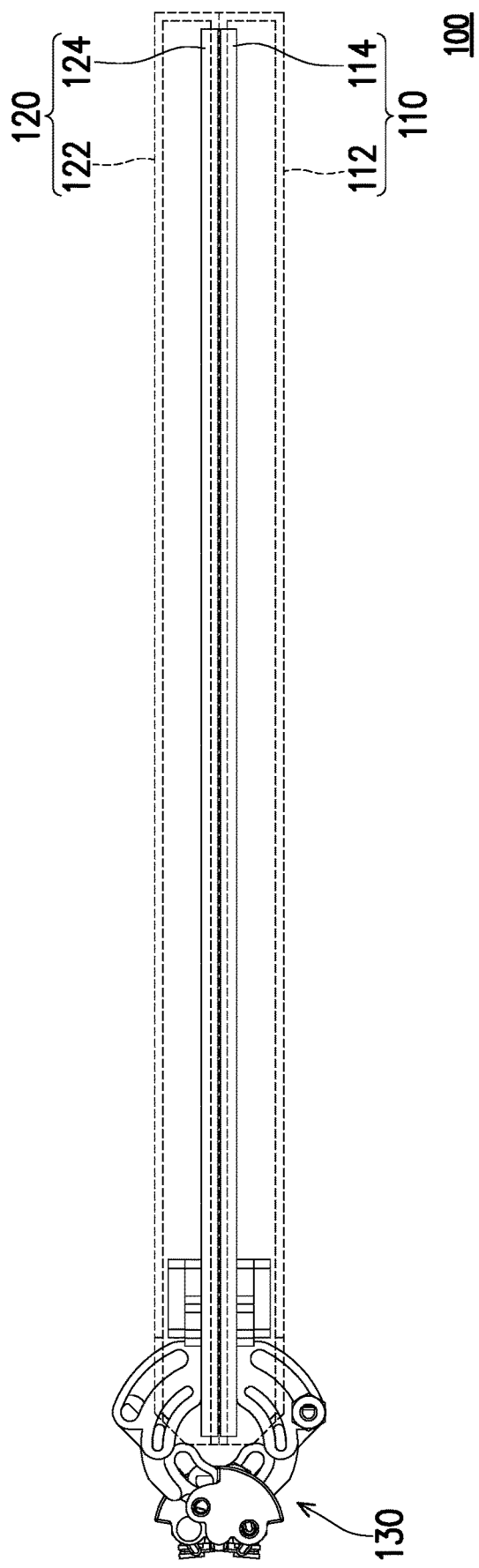
FIG. 1 is a side view of part of components of the electronic device according to an embodiment of the disclosure.
Figure 2:
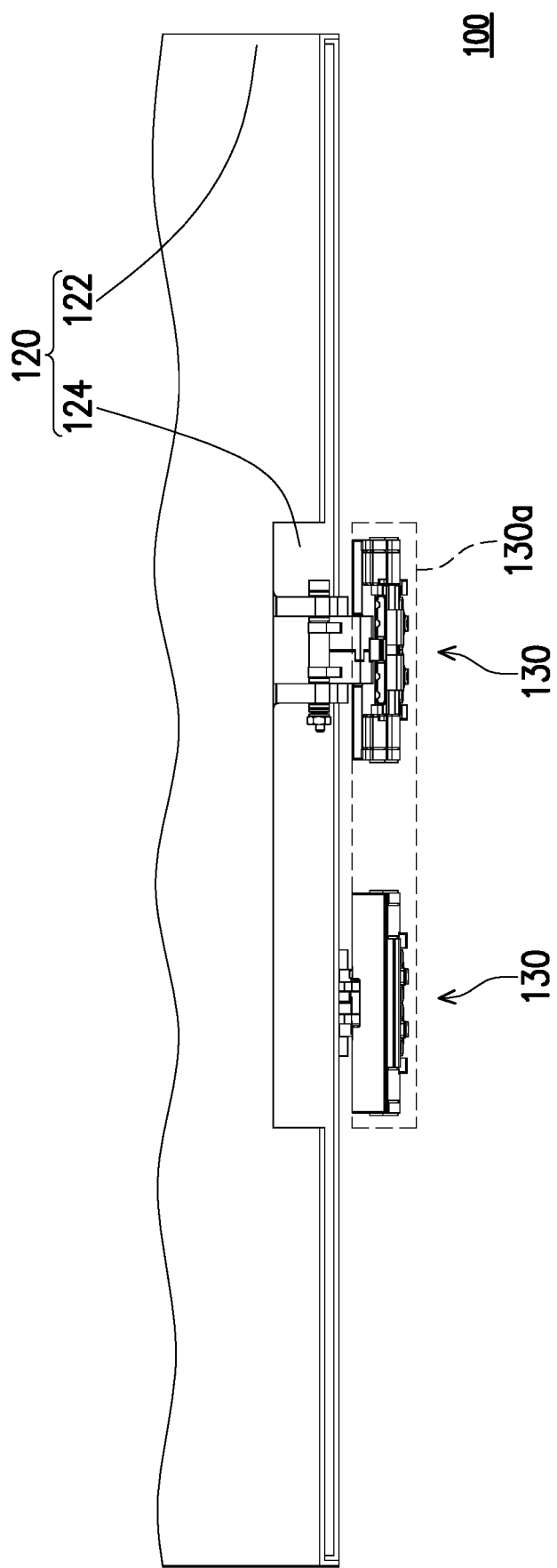
FIG. 2 is a top view of part of the electronic device according to FIG. 1.
Figure 3:
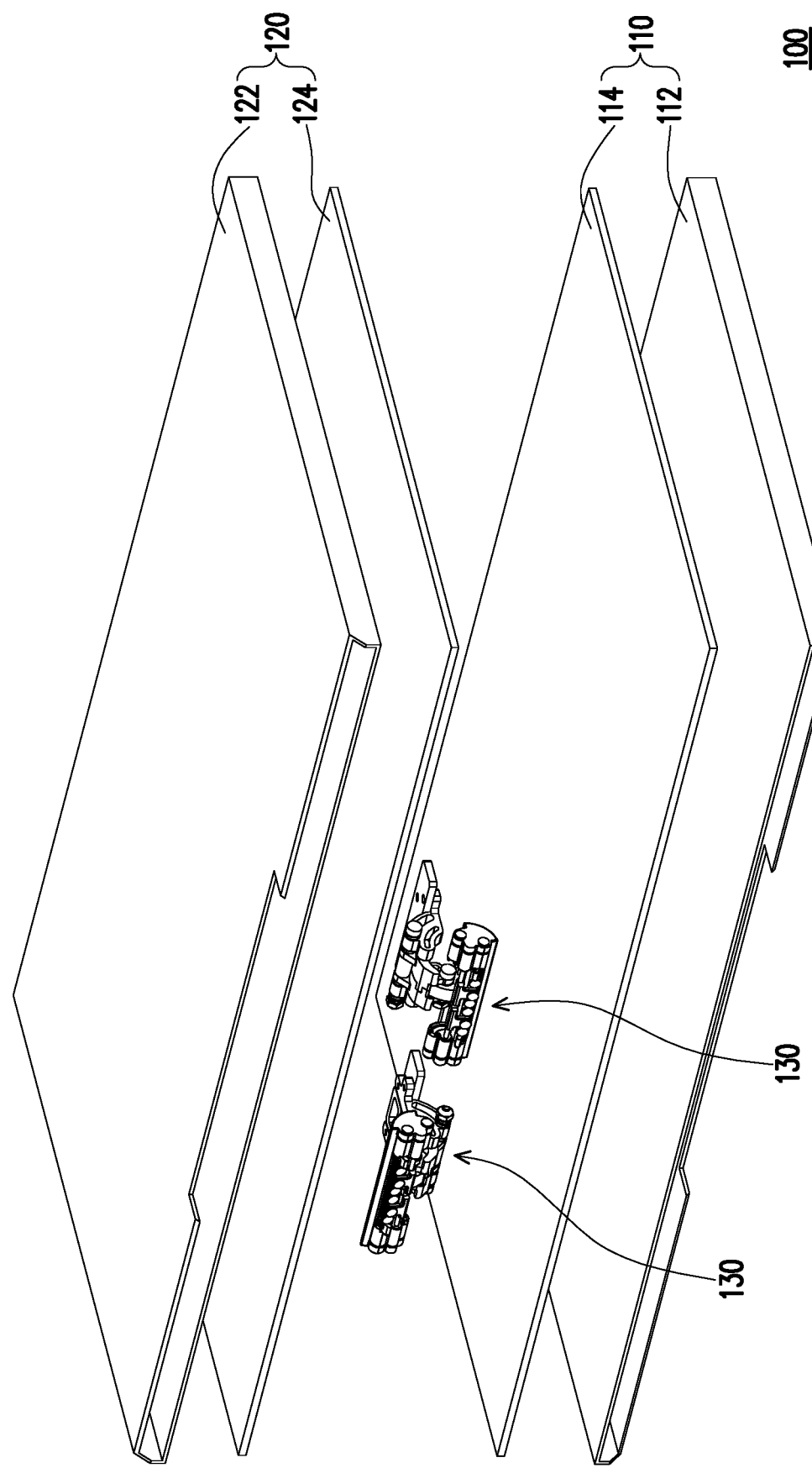
FIG. 3 is an exploded-view drawing of the electronic device according to FIG. 1.

FIG. 1 is a side view of part of components of the electronic device according to an embodiment of the disclosure. FIG. 2 is a top view of part of the electronic device according to FIG. 1. FIG. 3 is an exploded-view drawing of the electronic device according to FIG. 1. In FIG. 1 to FIG. 3, an electronic device 100 of the present embodiment is, for example, a dual-screen notebook computer which includes two bodies 110 and 120 and at least one hinge structure 130 (illustrated as two). The body 110 includes a housing 112 and a display 114, and the body 120 includes a housing 122 and a display 124. The two displays 114 and 124 are disposed respectively in the two housings 112 and 122. The two bodies 110 and 120 are connected pivotally to each other via the hinge structures 130.

Figure 4:
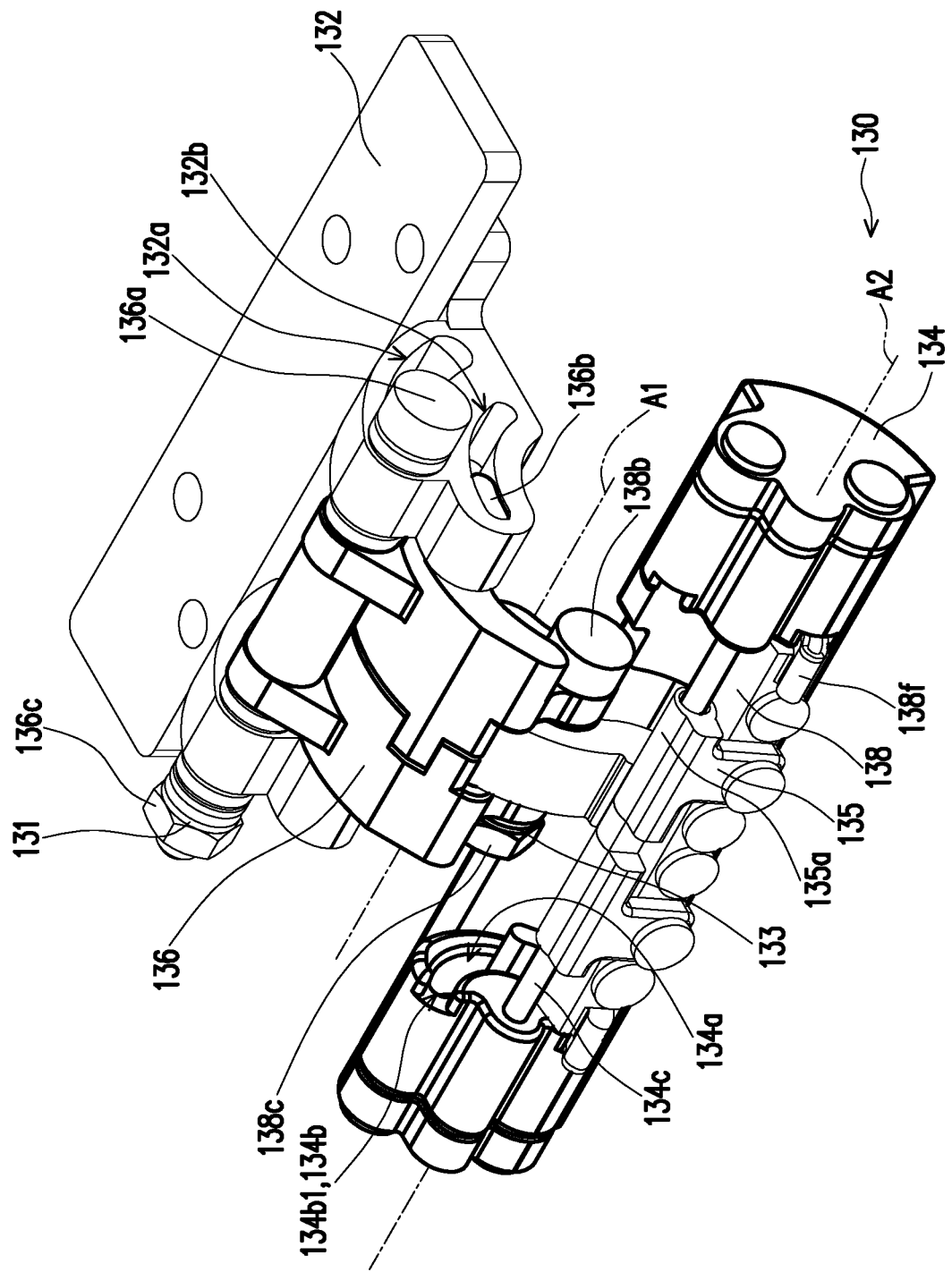
FIG. 4 is a stereogram of the hinge structure of FIG. 1.
Figure 5:
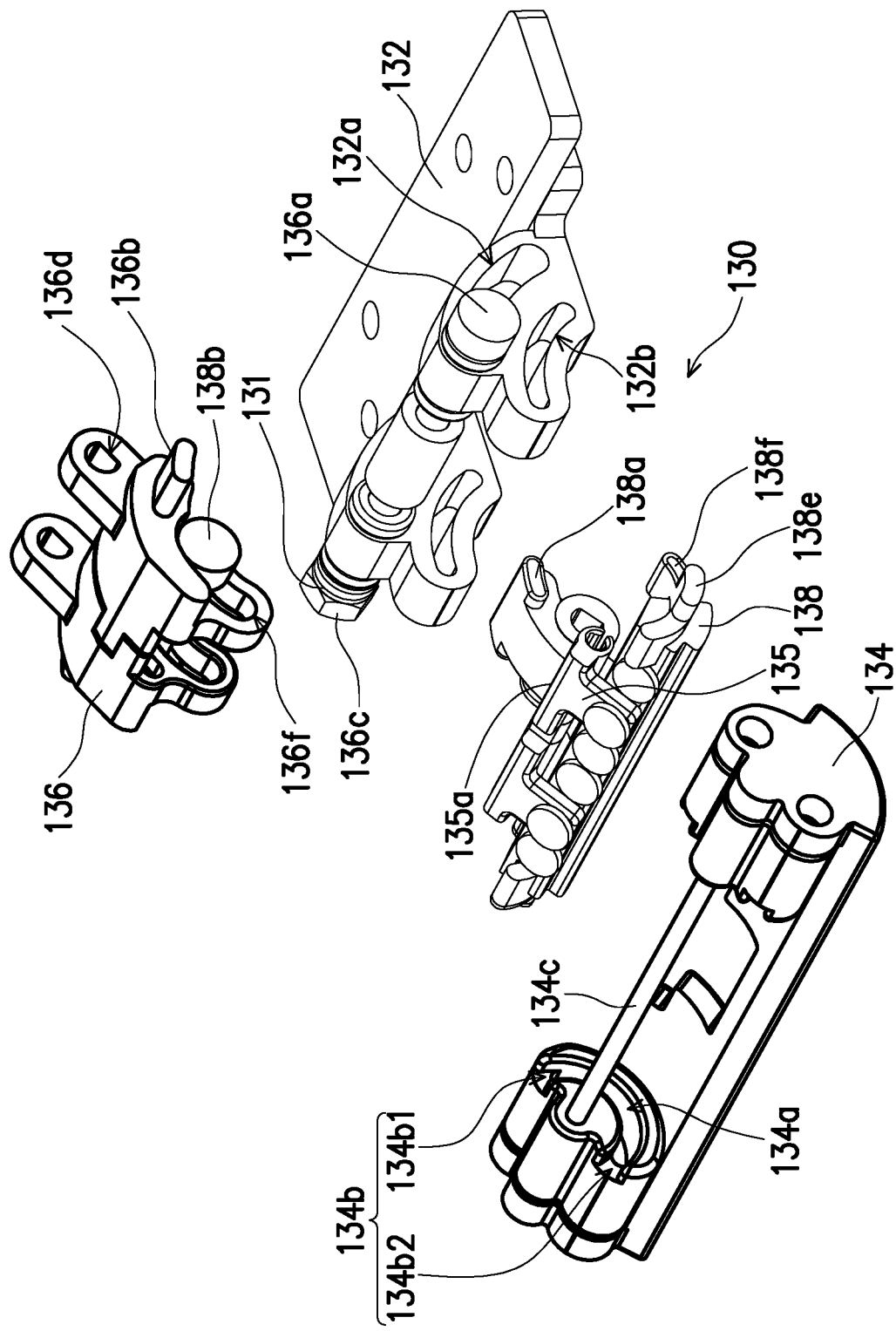
FIG. 5 is an exploded-view drawing of the hinge structure of FIG. 4.

FIG. 4 is a stereogram of the hinge structure of FIG. 1. FIG. 5 is an exploded-view drawing of the hinge structure of FIG. 4. In FIG. 4 and FIG. 5, each of the hinge structures 130 of the present embodiment includes a first bracket 132 and a second bracket 134, and is connected to the two bodies 110 and 120 shown in FIG. 1 to FIG. 3 respectively via the first bracket 132 and the second bracket 134. Specifically speaking, the two first brackets 132 of the two hinge structures 130 are connected directly to the two bodies 110 and 120 respectively, and the two second brackets 134 of the two hinge structures 130 are connected to each other via a frame 130a shown in FIG. 2. To simplify the drawing, FIG. 2 illustrates schematically the frame 130a. The frame 130a may be any structure in any suitable shape, and may be fixed to the second bracket 134 of each of the hinge structures 130 in any suitable manner. Each of the hinge structures 130 further includes a first rotation component 136 and a second rotation component 138. The first rotation component 136 and the second rotation component 138 are connected rotatably in sequence between the first bracket 132 and the second bracket 134, making each of the hinge structures 130 drive the two bodies 110 and 120 to rotate relatively to each other via the relative rotations of the first bracket 132, the first rotation component 136, the second rotation component 138, and the second bracket 134. Explanations with further details are provided below.

Figure 6A:
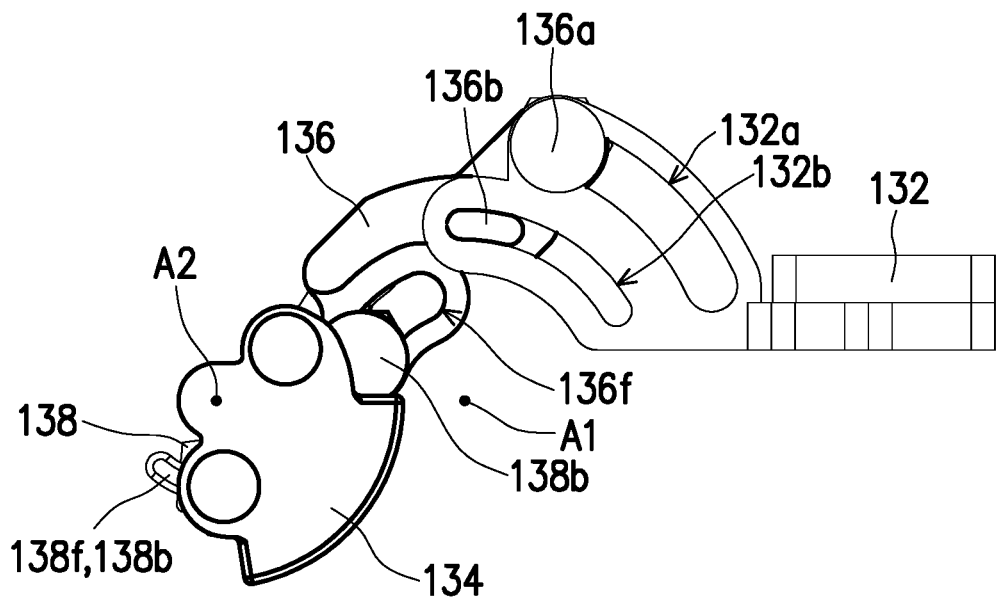
FIG. 6A to FIG. 6D illustrate the process of operating the hinge structure according to FIG. 4.

FIG. 6A to FIG. 6D illustrate the process of operating the hinge structure according to FIG. 4. FIG. 7A to FIG. 7D are the process of rotating the two bodies of the electronic device according to FIG. 1, and each corresponds respectively to FIG. 6A to FIG. 6D. In the present embodiment, the first rotation component 136 is connected rotatably to the first bracket 132 by taking a first axis A1 (a virtual axis as shown in FIGS. 4, 6A, and 7A) as a rotation axis. The second rotation component 138 is connected rotatably to the first rotation component 136 by taking the first axis A1 as a rotation axis, and the second rotation component 138 is connected rotatably to the second bracket 134 by taking a second axis A2 (a virtual axis as shown in FIGS. 4, 6A, and 7A) parallel to the first axis A1 as a rotation axis.

Figure 6B:
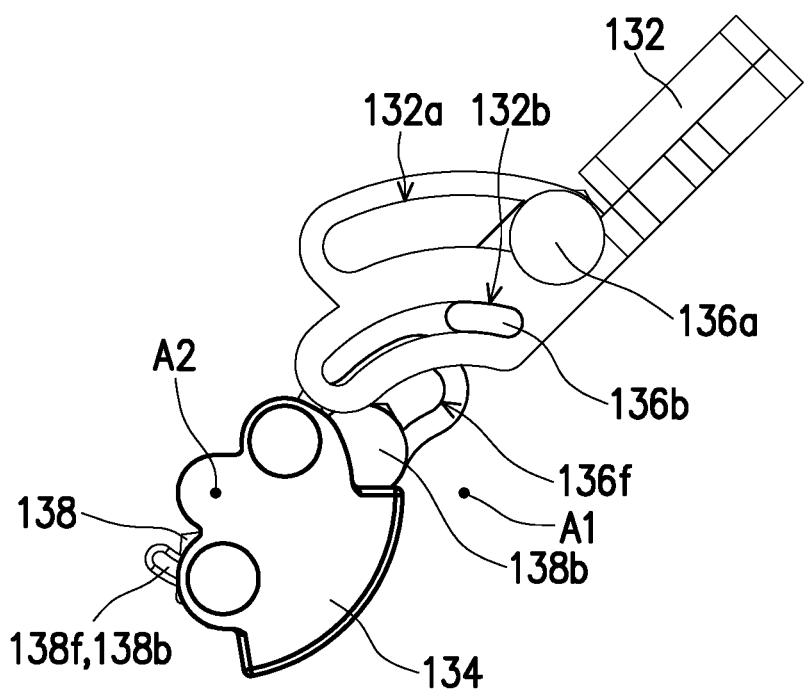
Figure 6C:
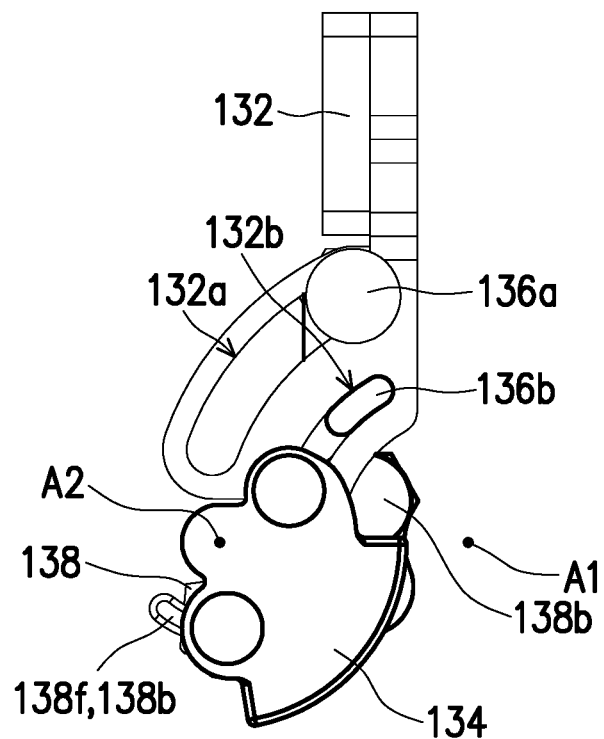
Figure 6D:
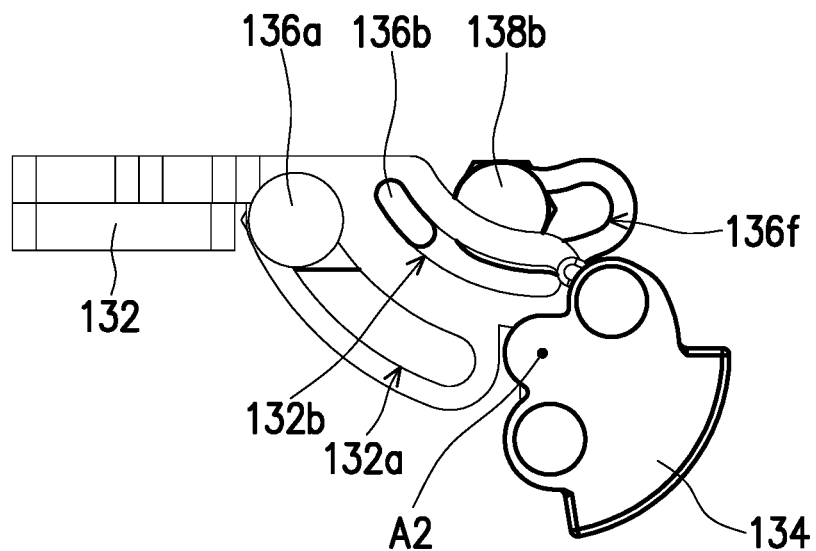
Figure 7A:
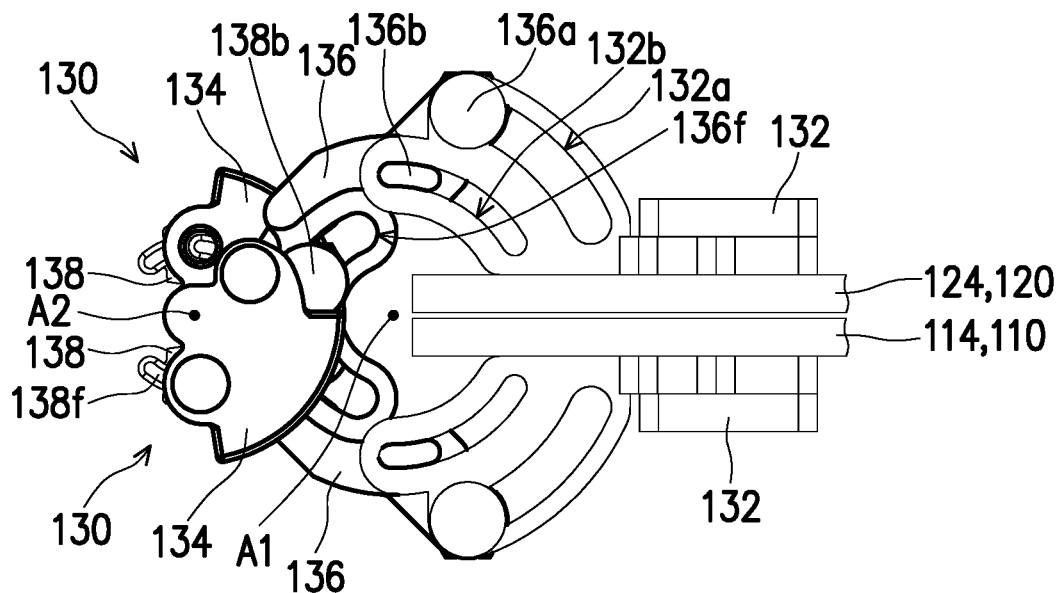
FIG. 7A to FIG. 7D are the process of rotating the two bodies of the electronic device according to FIG. 1.
Figure 7B:
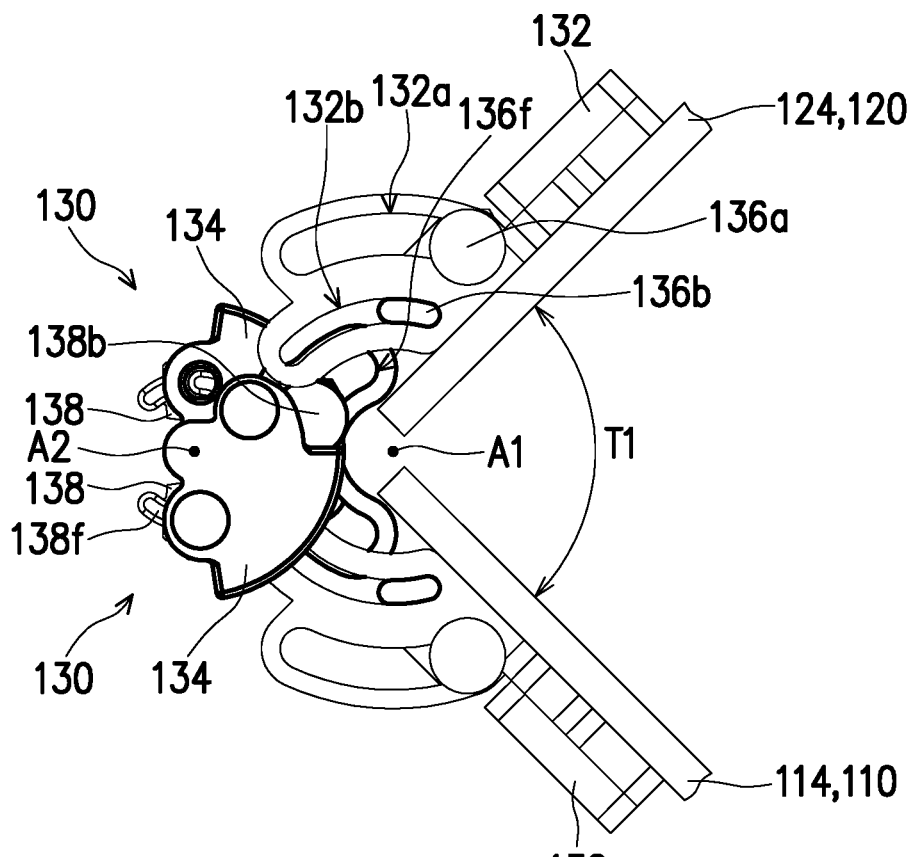
Figure 7C:
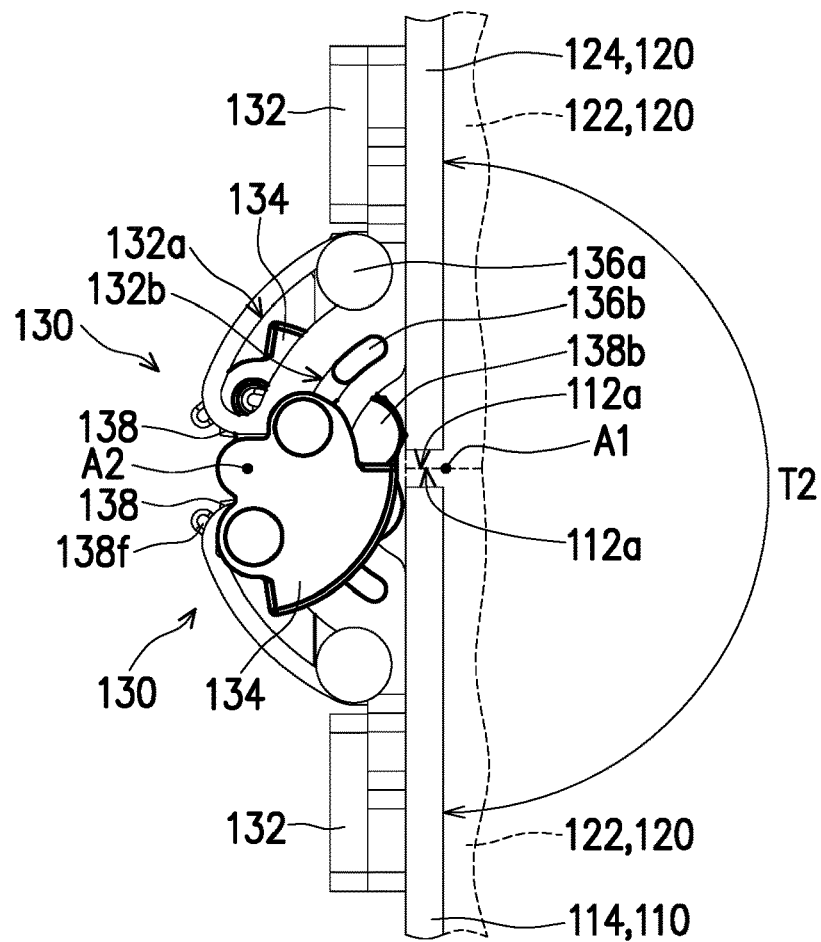
Figure 7D:
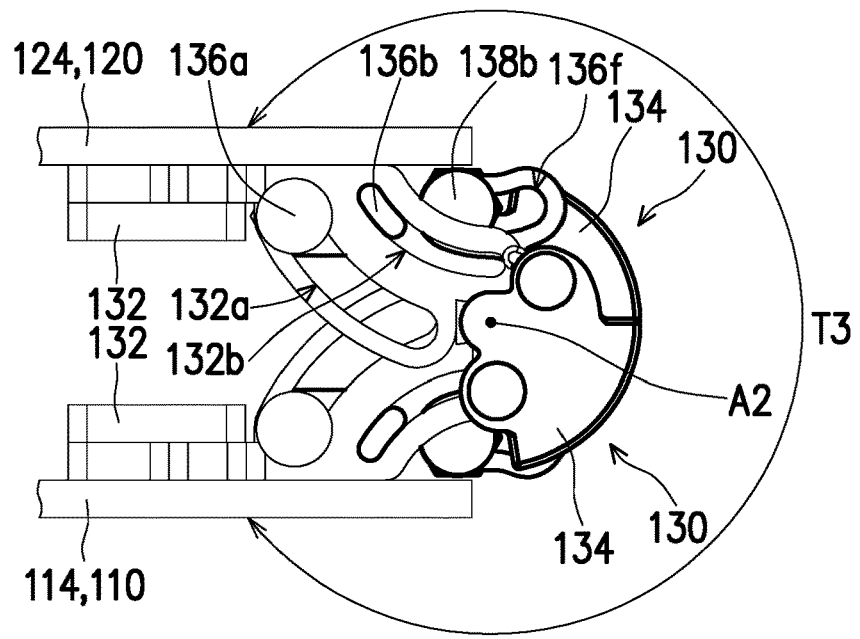
Figure 8A:
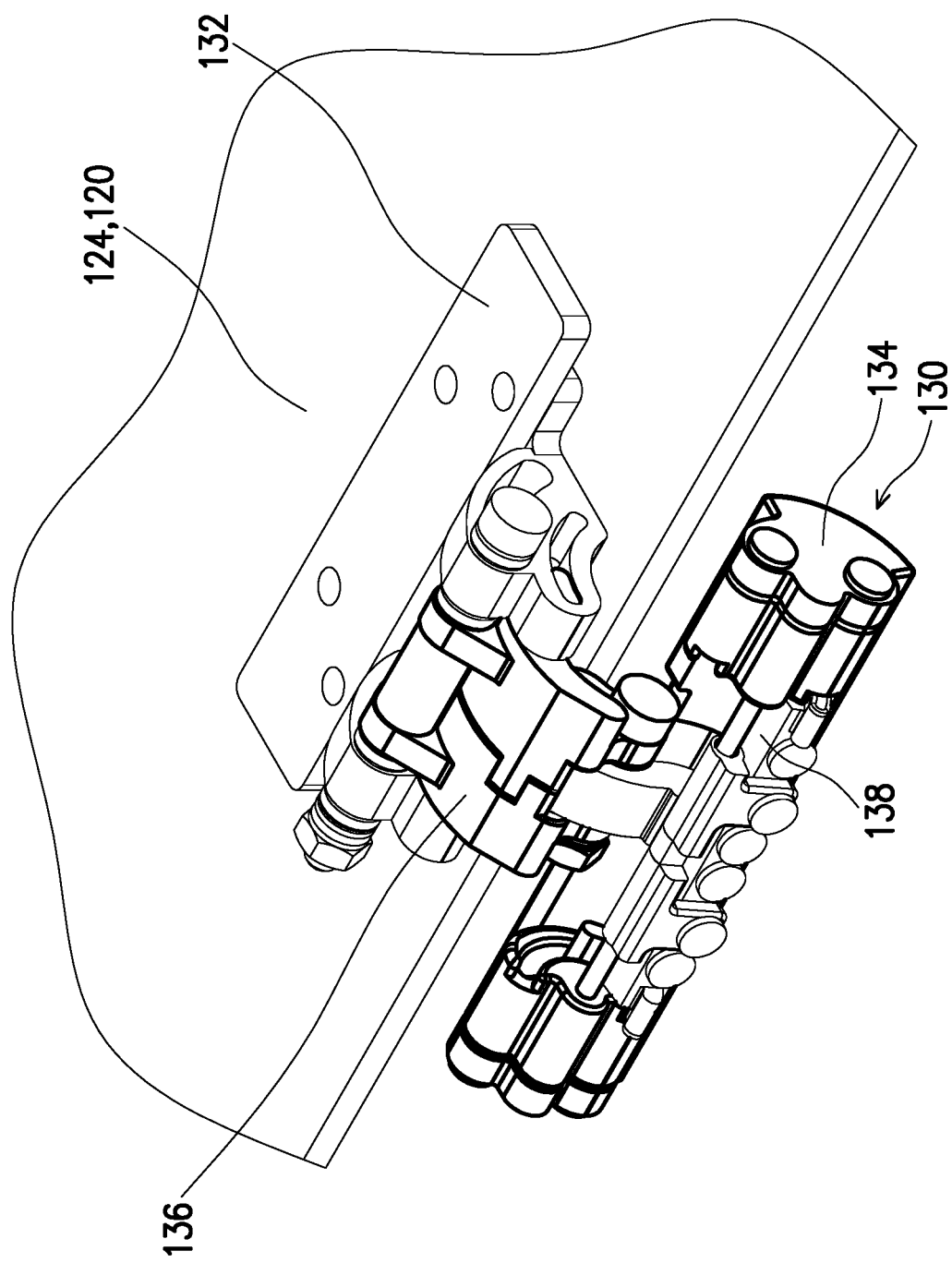
Figure 8C:
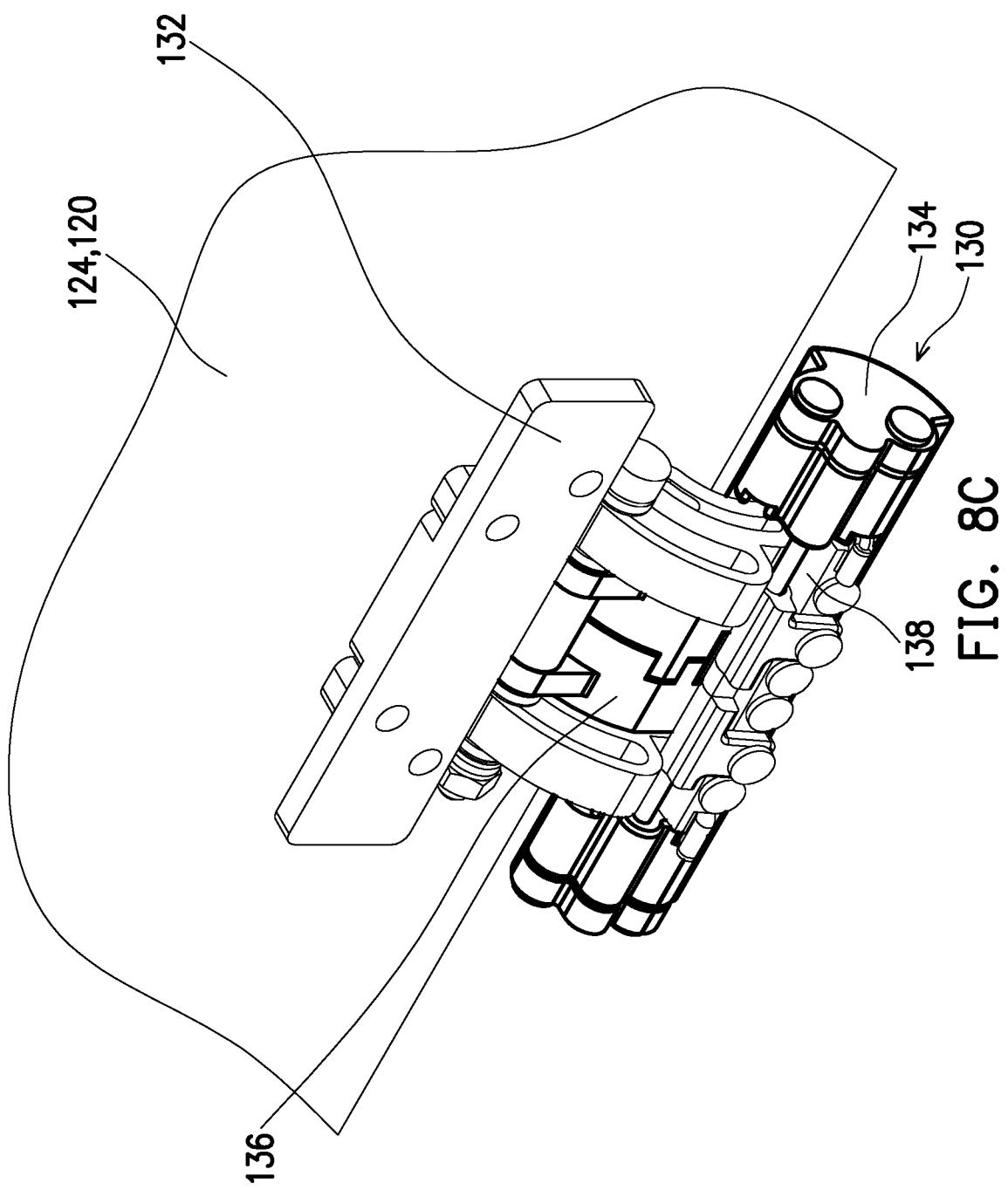
Figure 8D:
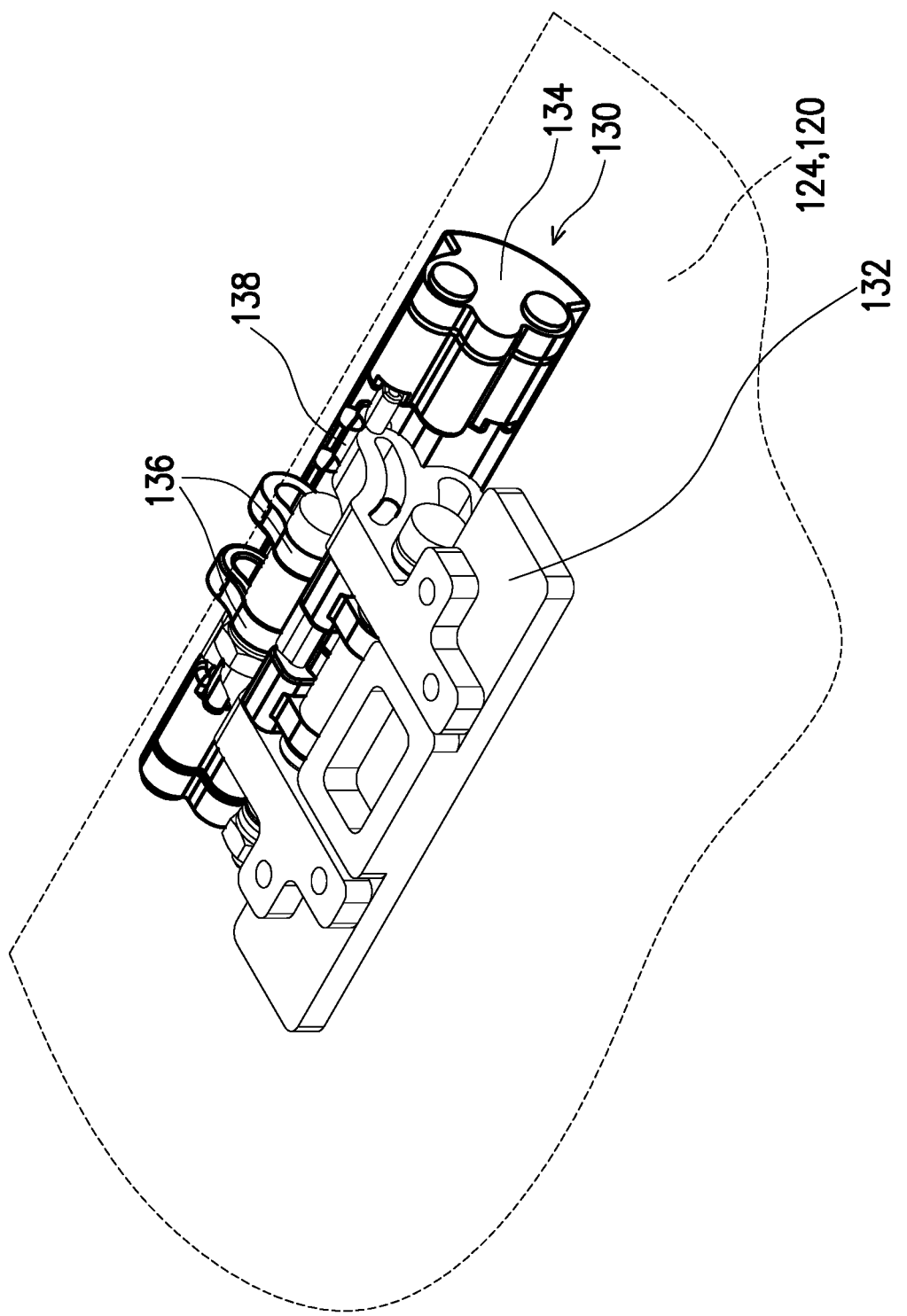

FIG. 8A to FIG. 8D are stereograms of part of components of the electronic device according to FIG. 7A to FIG. 7D. When the two bodies 110 and 120 are closed as shown in FIG. 1 and FIG. 7A, each of the first brackets 132 is adapted to take the first axis A1 as a rotation axis and rotate relative to the corresponding first rotation component 136 as shown in FIGS. 6A, 7A, 8A to 6B, 7B, 8B, making the two bodies 110 and 120 unfold relatively at a first angle T1 (marked in FIG. 7B; for example, 90 degrees). The, each of the first rotation components 134 is adapted to take the first axis A1 as a rotation axis and rotate relative to the corresponding second rotation component 136 as shown in FIGS. 6B, 7B, 8B to 6C, 7C, and 8C, making the two bodies 110 and 120 unfold relatively at a second angle T2 (marked in FIG. 7C; for example, 180 degrees) and become flattened. Based on the relations of relative shapes and sizes of the two bodies 110 and 120, the design of the first axis A1 in a suitable position may bring edges 112a and 122a of the flattened two bodies 110 and 120 to stand tightly against each other as shown in FIG. 7C. Then, each of the second rotation components 138 is adapted to take the second axis A2 as a rotation axis and rotate relative to the corresponding second bracket 134 as shown in FIGS. 6B, 7B, 8B to 6C, 7C, and 8C, making the two bodies 110 and 120 unfold relatively to each other at a third angle T3 (marked in FIG. 7D; for example, 360 degrees) and become reversely folded.

As described above, in the hinge structure 130 of the present embodiment, the first bracket 132 which rotates along the first axis A1 relative to the first rotation component 136 and the second rotation component 136 which rotates along the first axis A1 relative to the first rotation component 136 may drive the two bodies 110 and 120 to rotate relatively until they are flattened and stand tightly against each other. When the two bodies 110 and 120 are flattened and stand tightly against each other, the two bodies 110 and 120 cannot continue to rotate along the first axis A1 due to structural interference. In light of this, the disclosure designs the two bodies 110 and 120 to rotate smoothly relatively to each other and become reversely folded by rotating the second rotation component 136 relative to the second bracket 134 along the second axis A2 different from the first axis A1. In other words, the design of the present embodiment described above not only allows the two bodies 110 and 120 to stand tightly against each other when flattened but also allows the two bodies 110 and 120 to rotate further and become reversely folded, which fits even more to the user's need in terms of operation.

The following are the description of the connections between each component of the hinge structure 130 of the present embodiment in detail.

Figure 9A:
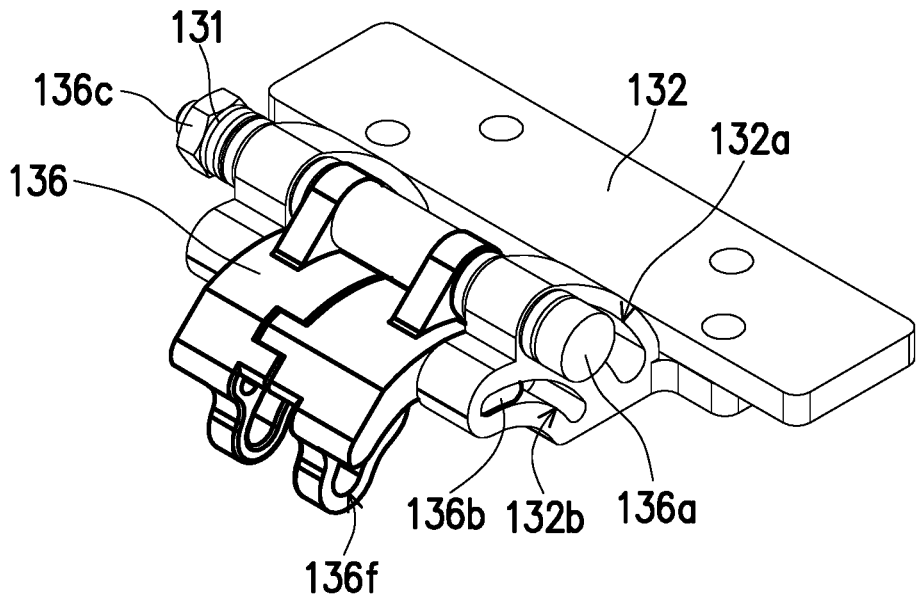
FIG. 9A to FIG. 9B illustrate the process of operating the first bracket and the first rotation component according to FIG. 4.
Figure 9B:
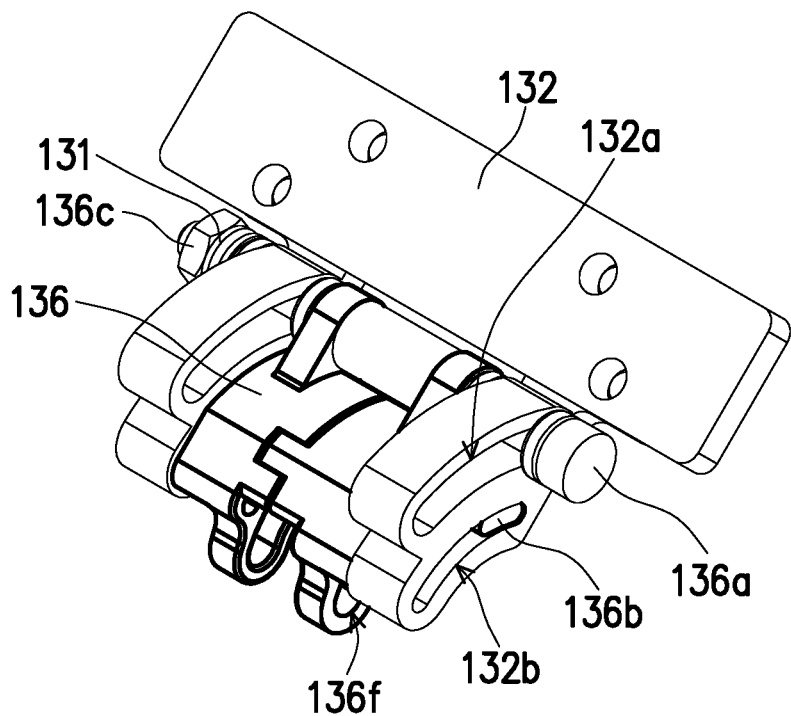
Figure 10:
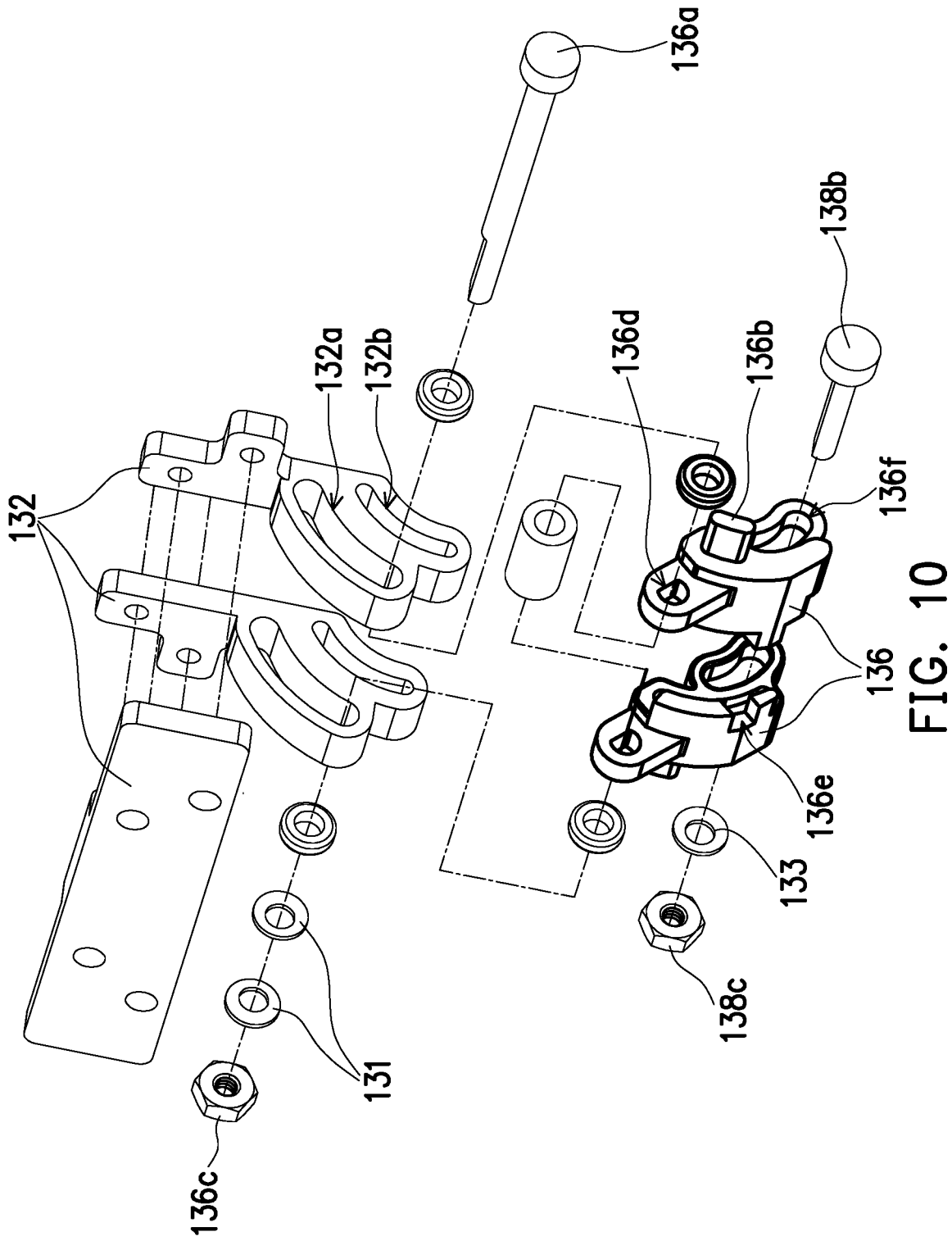
FIG. 10 is an exploded-view drawing of the first bracket and the first rotation component according to FIG. 9A.

FIG. 9A and FIG. 9B illustrate the process of operating the first bracket and the first rotation component, and each corresponds respectively to FIG. 6A and FIG. 6B. FIG. 10 is an exploded-view drawing of the first bracket and the first rotation component according to FIG. 9A. In FIG. 9A, FIG. 9B, and FIG. 10, the first bracket 132 of the present embodiment has two arc-shaped guides 132a and 132b, the centers of curvature of the arc-shaped guide 132a and the arc-shaped guide 132b are both located on the first axis A1 (illustrated in FIG. 6A), and the radii of curvature of the two arc-shaped guides 132a and 132b are different. The first rotation component 136 has two convex portions 136a and 136b, and the two convex portions 136a and 136b are disposed slidably respectively to the two arc-shaped guides 132a and 132b. The mutual cooperations between the arc-shaped guides 132a and 132b and the convex portions 136a and 136b make the first bracket 132 and the first rotation component 136 connected rotatably to each other by taking the first axis A1 as a rotation axis.

Specifically speaking, the convex portion 136a may be a screw, which passes through the arc-shaped guide 132a of the first bracket 132 and a through hole 136d of the first rotation component 136 (illustrated in FIG. 10) and is interlocked with a nut 136c. The convex portion 136a is thereby fixed to the through hole 136d of the first rotation component 136 and is disposed slidably to the arc-shaped guide 132a of the first bracket 132. Moreover, the hinge structure 130 further includes at least one torque-providing element 131. The torque-providing element 131 is, for example, a torque elastic piece and is connected coaxially to the convex portion 136a to provide the required torque between the first bracket 132 and the first rotation component 136. In other embodiments, the torque-providing element 131 may be in other suitable forms, and the disclosure is not limited thereto. Furthermore, the convex portion 136b may be a sliding block on the first rotation component 136. By simultaneously disposing the two convex portions 136a and 136b to correspond respectively to the two arc-shaped guides 132a and 132b, the convex portion 136a may be prevented from rotating unexpectedly in the arc-shaped guide 132a.

Figure 11:
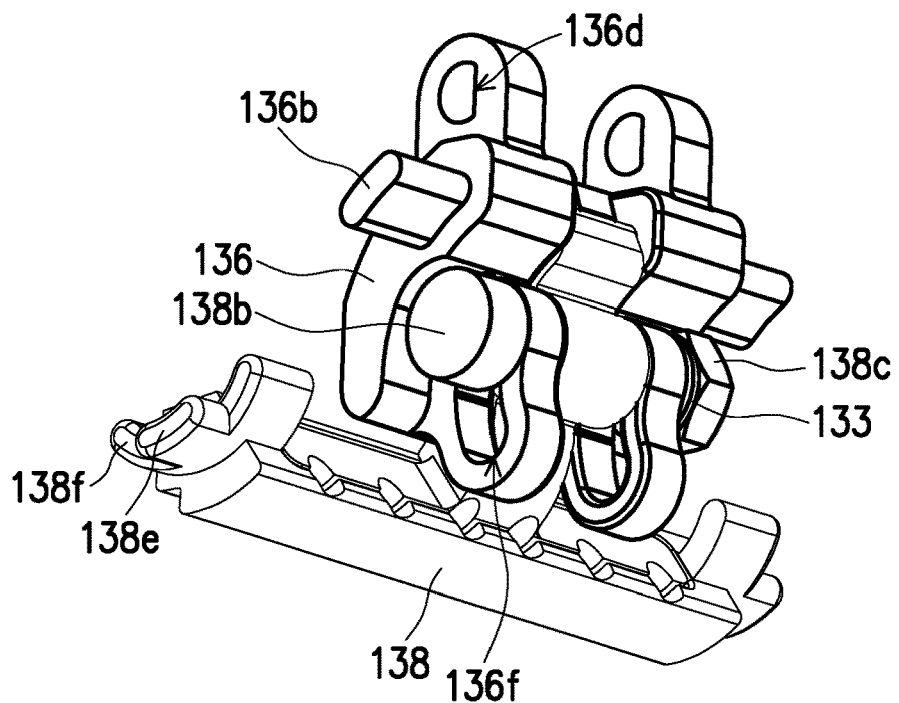
FIG. 11 is a stereogram of the first rotation component and the second rotation component according to FIG. 4.
Figure 12:
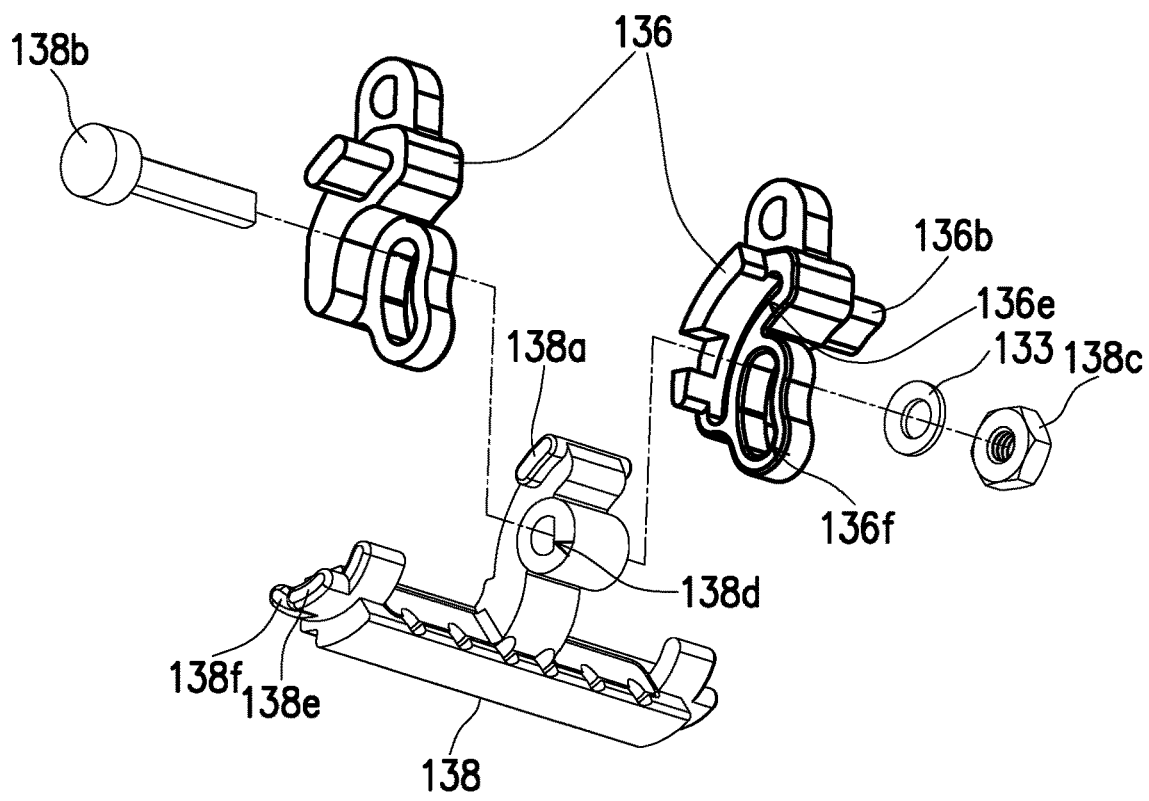
FIG. 12 is an exploded-view drawing of the first rotation component and the second rotation component according to FIG. 11.
Figure 13:
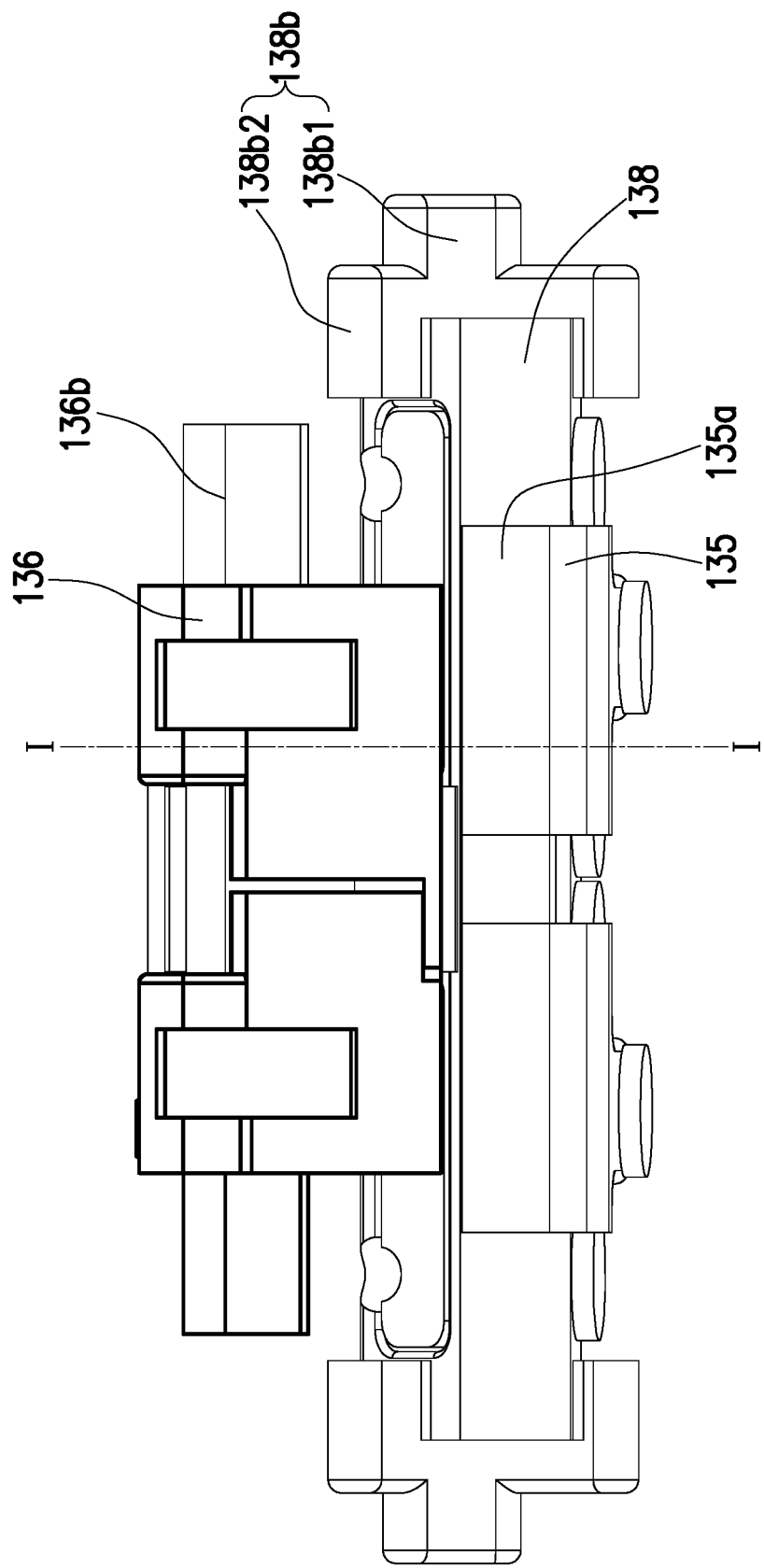
FIG. 13 is a top view of the first rotation component and the second rotation component according to FIG. 11.
Figure 14A:
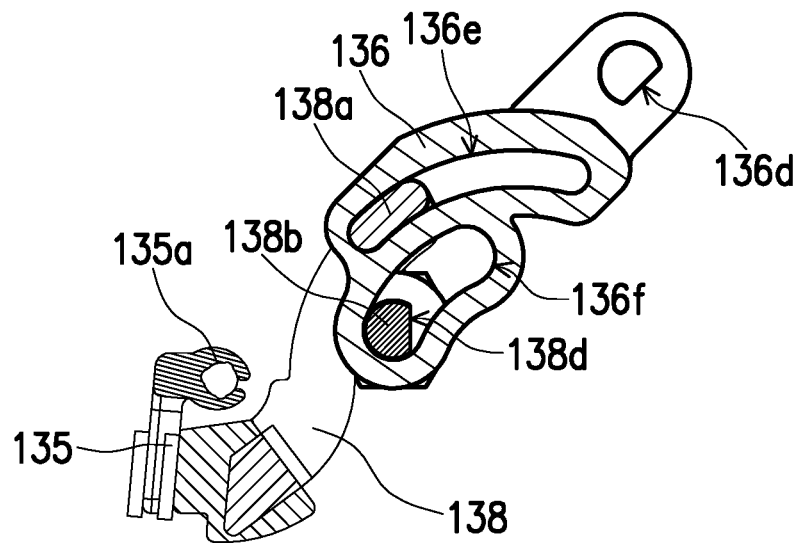
FIG. 14A and FIG. 14B illustrate the process of operating the first rotation component and the second rotation component according to FIG. 4.
Figure 14B:
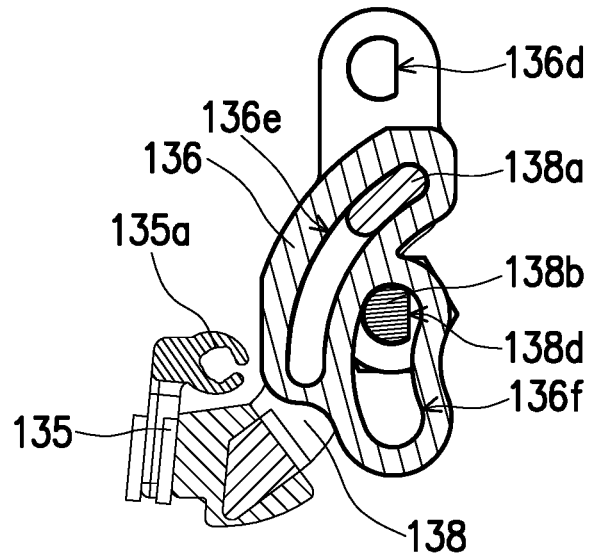
Figure 15A:
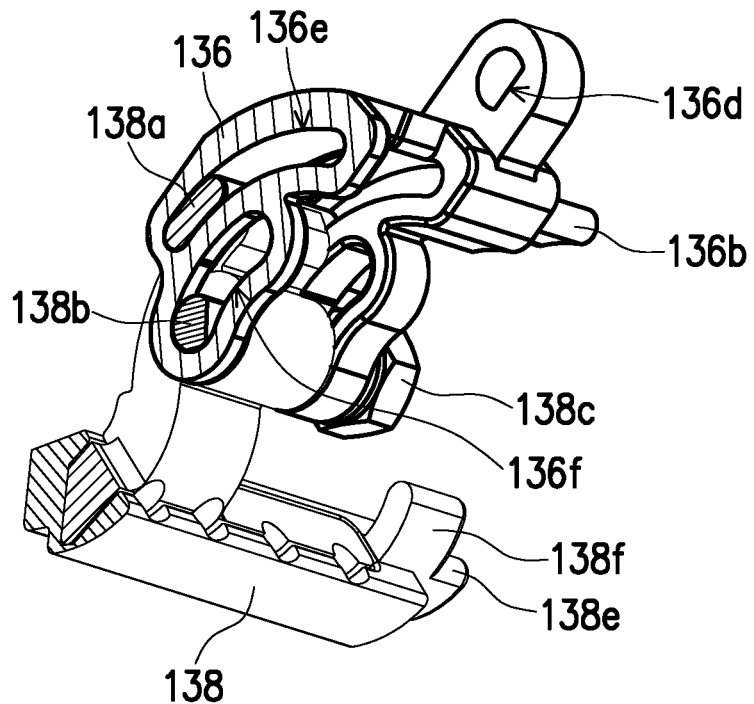
FIG. 15A and FIG. 15B are stereograms of the first rotation component and the second rotation component according to FIG. 14A and FIG. 14B respectively.
Figure 15B:
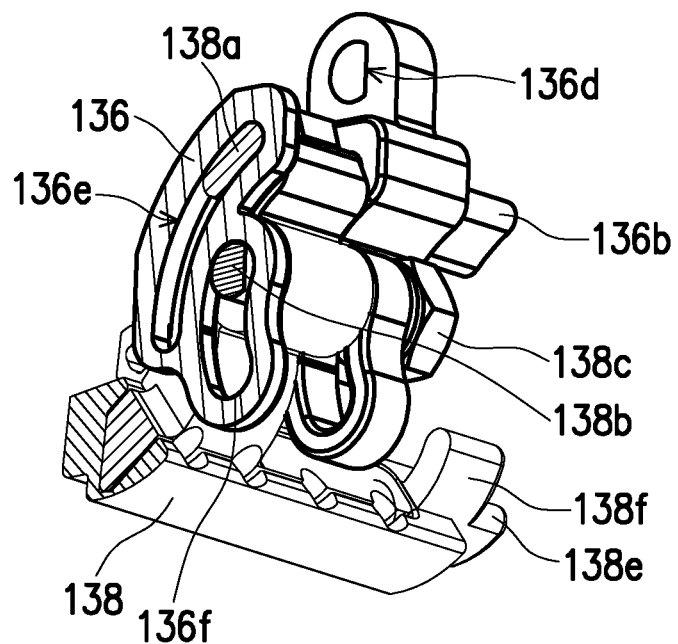

FIG. 11 is a stereogram of the first rotation component and the second rotation component according to FIG. 4. FIG. 12 is an exploded-view drawing of the first rotation component and the second rotation component according to FIG. 11. FIG. 13 is a top view of the first rotation component and the second rotation component according to FIG. 11. FIG. 14A to FIG. 14B illustrate the process of operating the first rotation component and the second rotation component, and each corresponds respectively to FIG. 6B to FIG. 6B, and its sectional view corresponds to the line I-I in FIG. 13. FIG. 15A and FIG. 15B are stereograms of the first rotation component and the second rotation component according to FIG. 14A and FIG. 14B respectively, and its sectional view corresponds to the line I-I in FIG. 13. In FIG. 11 to FIG. 15B, the first rotation component 136 of the present embodiment has two arc-shaped guides 136e and 136f, the centers of curvature of the arc-shaped guide 136e and the arc-shaped guide 136f are both located on the first axis A1 (illustrated in FIG. 6A), and the radii of curvature of the two arc-shaped guides 136e and 136f are different. The second rotation component 138 has two convex portions 138a and 138b, and the two convex portions 138a and 138b are disposed slidably respectively to the two arc-shaped guides 136e and

136f. The mutual cooperations between the arc-shaped guides 136e and 136f and the convex portions 138a and 138b make the first rotation component 136 and the second rotation component 138 connected rotatably to each other by taking the first axis A1 as a rotation axis.

Specifically speaking, the convex portion 138b may be a screw, which passes through the arc-shaped guide 136f of the first rotation component 136 and a through hole 138d of the second rotation component 138 (illustrated in FIG. 10) and is interlocked with a nut 138c. The convex portion 138b is thereby fixed to the through hole 138d of the second rotation component 138 and is disposed slidably to the arc-shaped guide 136f of the first rotation component 136. Moreover, the hinge structure 130 further includes at least one torque-providing element 133. The torque-providing element 133 is, for example, a torque elastic piece and is connected coaxially to the convex portion 138b to provide the required torque between the first rotation component 136 and the second rotation component 138. In other embodiments, the torque-providing element 133 may be in other suitable forms, and the disclosure is not limited thereto. Furthermore, the convex portion 138a may be a sliding block on the second rotation component 138. By disposing simultaneously the two convex portions 138a and 138b to correspond respectively to the two arc-shaped guides 136e and 136f, the convex portion 138b may be prevented from rotating unexpectedly in the arc-shaped guide 136f.

Furthermore, as described above, the rotation of the hinge structure 130 along the first axis A1 is divided into two stages (i.e., the relative rotation between the first bracket 132 and the first rotation component 134 and the relative rotation between the first rotation component 134 and the second rotation component 136), which may prevent the extension length of the arc-shaped guide on a single component from being too large and restricting the overall structural design.

Figure 16:
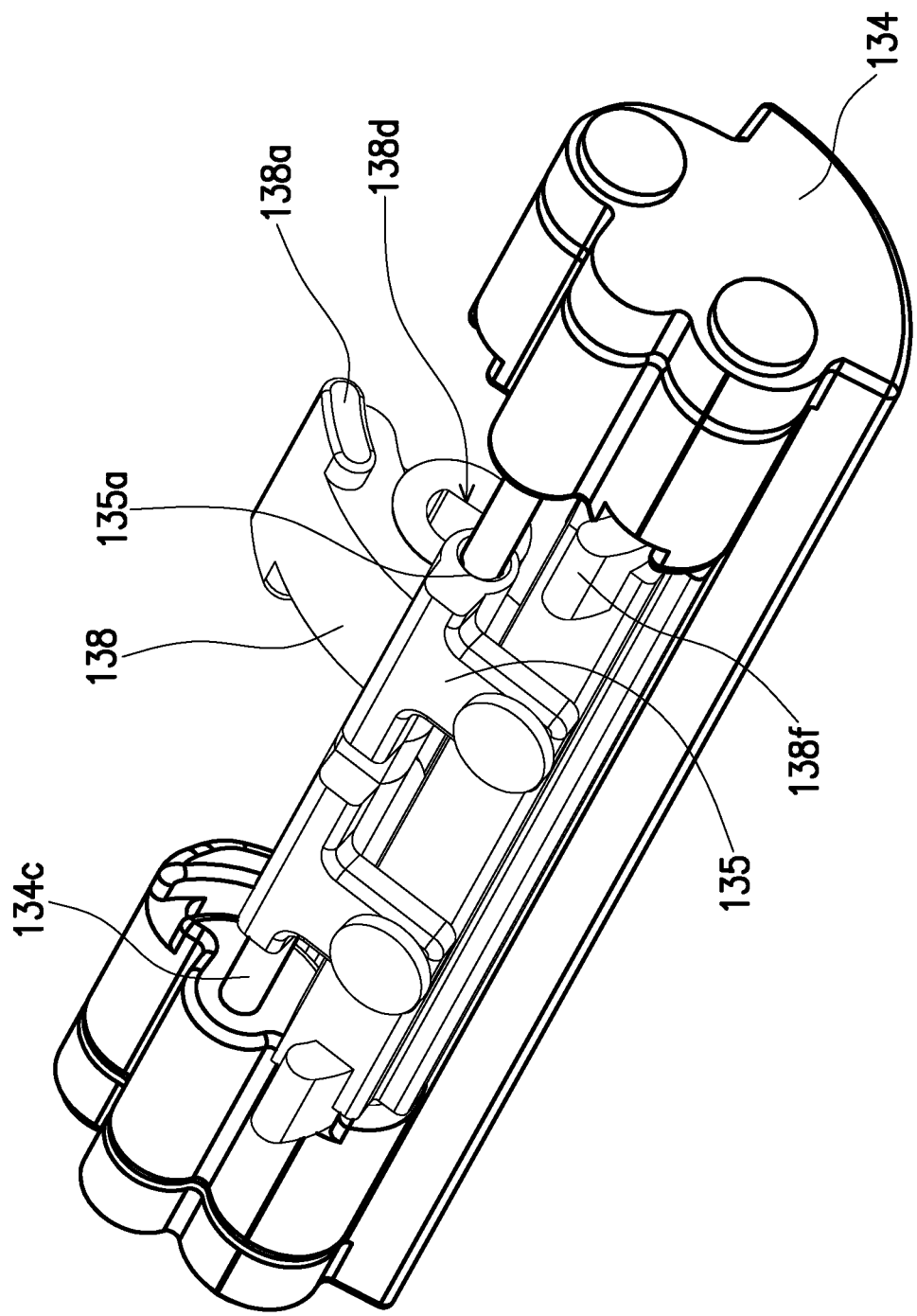
FIG. 16 is a stereogram of the second rotation component and the second bracket according to FIG. 4.
Figure 17:
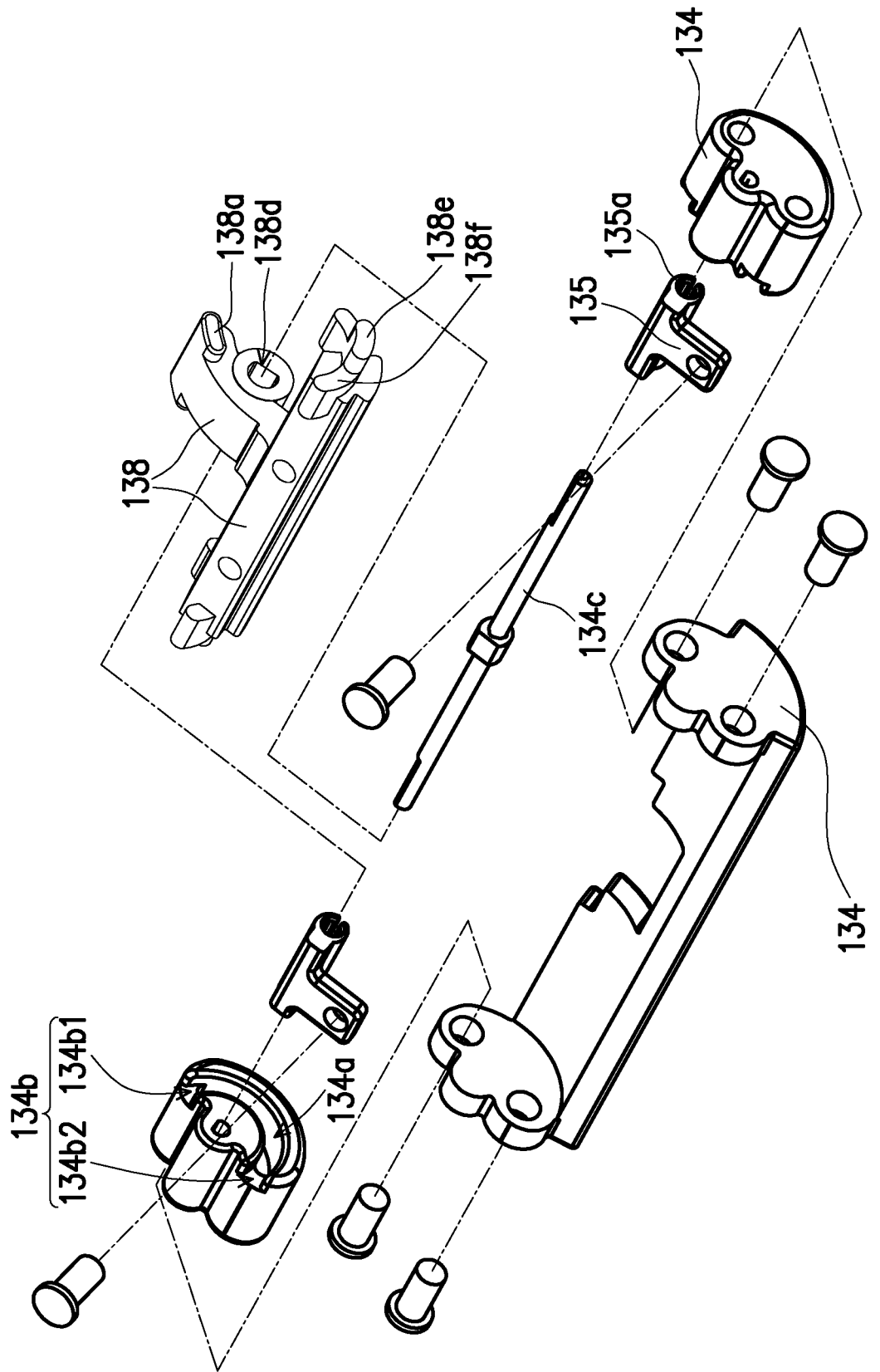
FIG. 17 is an exploded-view drawing of the second rotation component and the second bracket according to FIG. 16.
Figure 18:
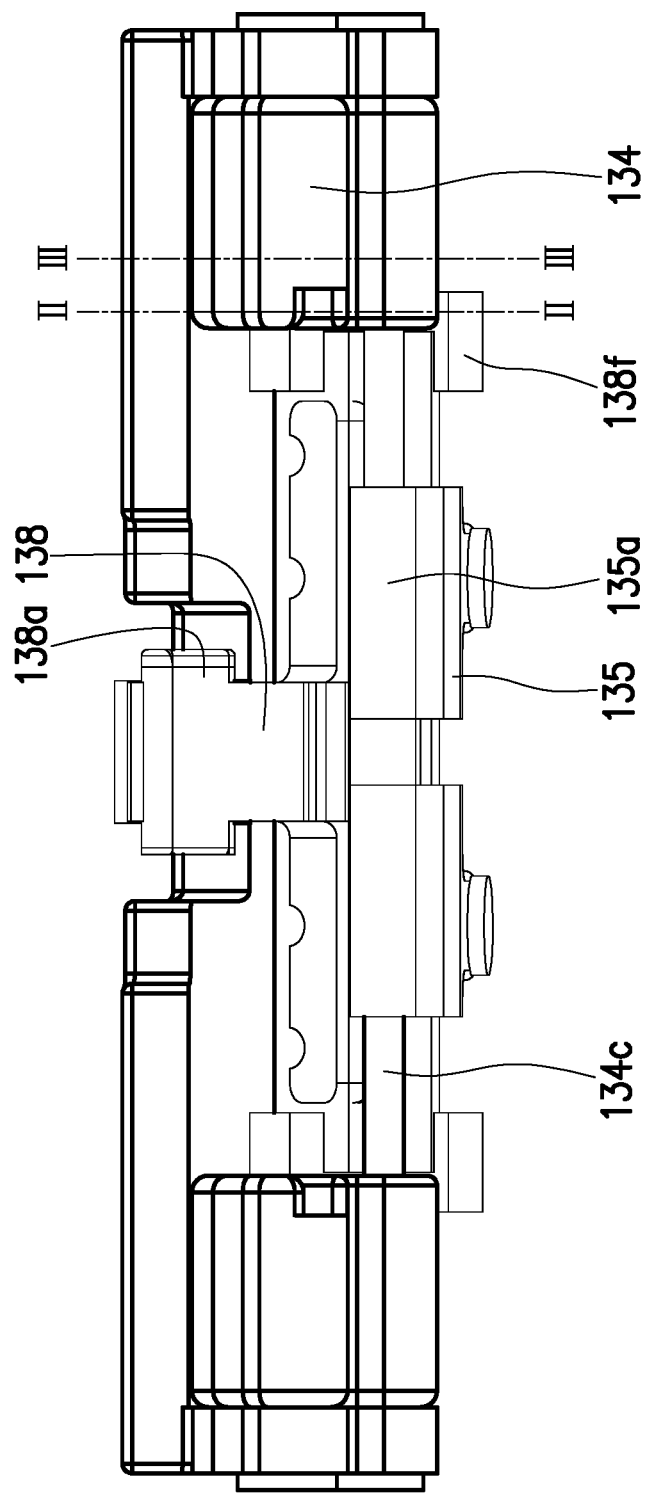
FIG. 18 is a top view of the second rotation component and the second bracket according to FIG. 16.
Figure 19A:
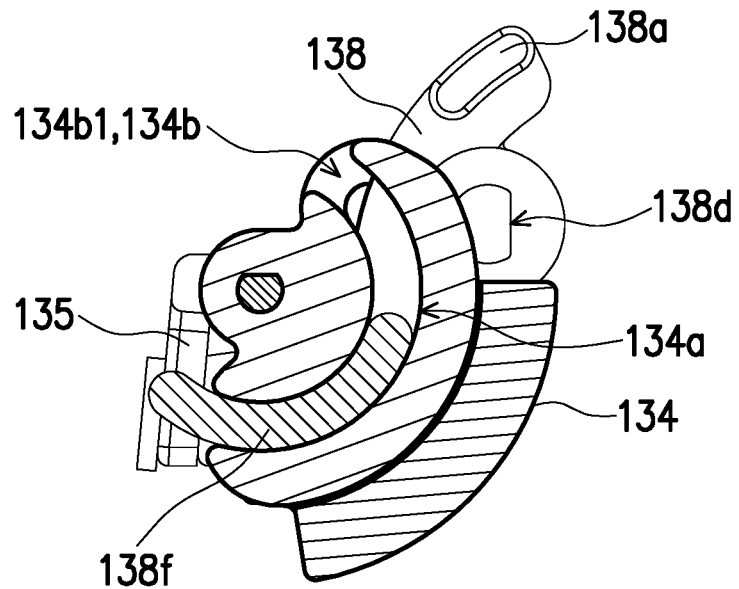
FIG. 19A and FIG. 19B illustrate the process of operating the second rotation component and the second bracket according to FIG. 4.
Figure 19B:
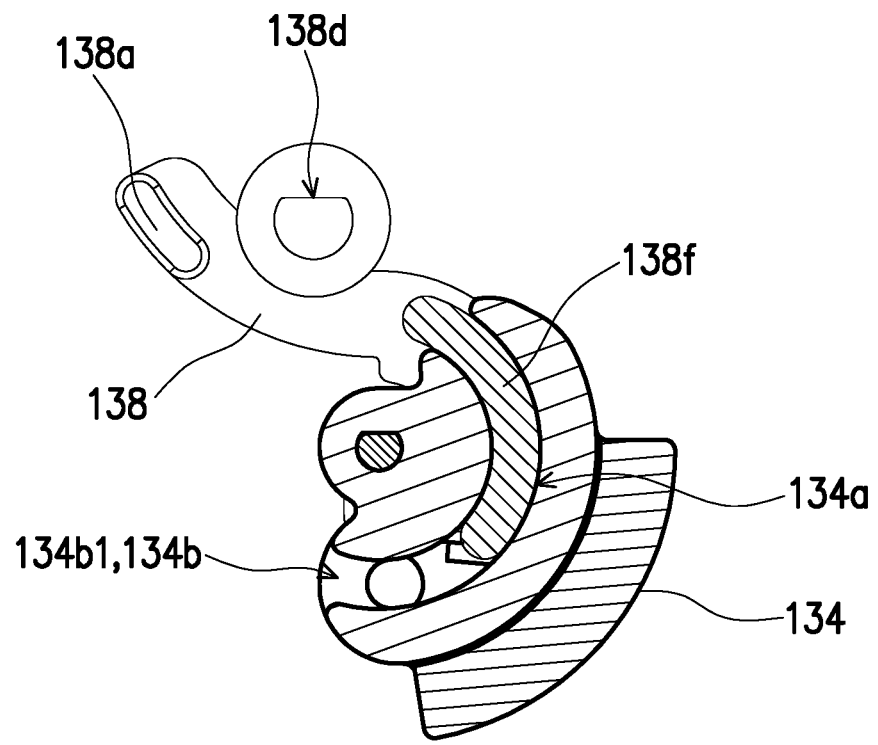
Figure 19C:
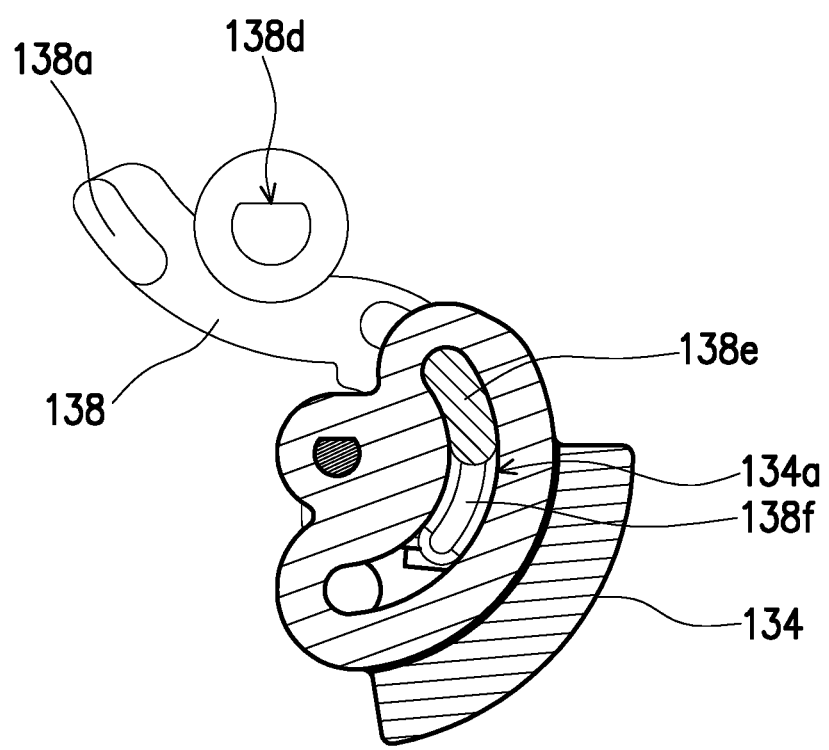
FIG. 19C illustrates another sectional view of the second rotation component and the second bracket according to FIG. 19B.
Figure 20A:
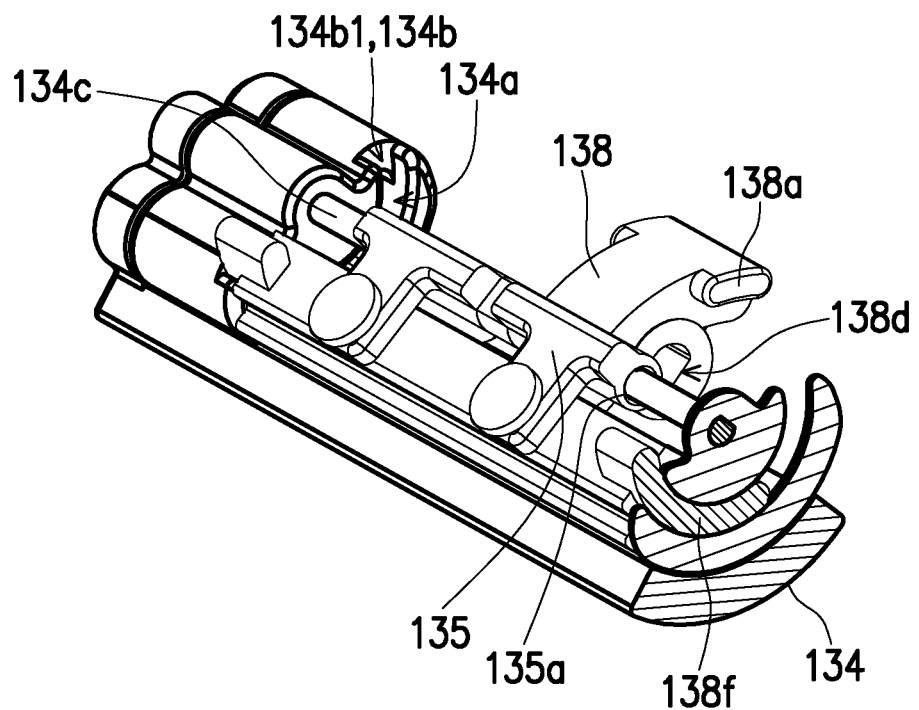
FIG. 20A and FIG. 20B are stereograms of the second rotation component and the second bracket according to FIG. 19A and FIG. 19B respectively.
Figure 20B:
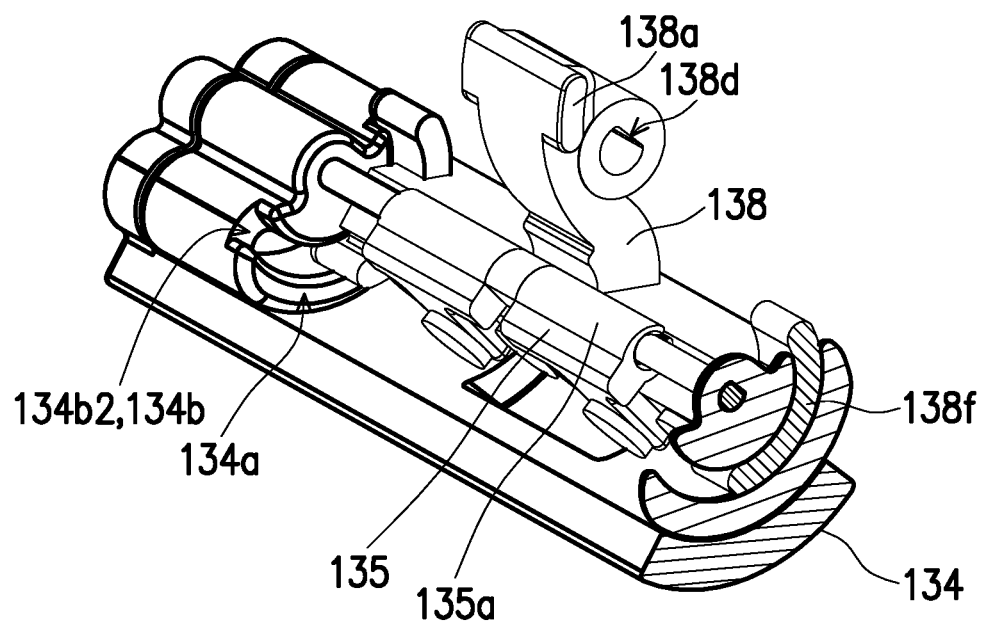

FIG. 16 is a stereogram of the second rotation component and the second bracket according to FIG. 4. FIG. 17 is an exploded-view drawing of the second rotation component and the second bracket according to FIG. 16. FIG. 18 is a top view of the second rotation component and the second bracket according to FIG. 16. FIG. 19A to FIG. 19B illustrate the process of operating the second rotation component and the second bracket, and each corresponds respectively to FIG. 6B to FIG. 6C, and its sectional view corresponds to the line II-II in FIG. 18. FIG. 19C illustrates another sectional view of the second rotation component and the second bracket according to FIG. 19B, and its sectional view corresponds to the line II-II in FIG. 18. FIG. 20A and FIG. 20B are stereograms of the second rotation component and the second bracket according to FIG. 19A and FIG. 19B respectively, and its sectional view corresponds to the line II-II in FIG. 18. In FIG. 16 to FIG. 20B, the second bracket 134 of the present embodiment has two arc-shaped guides 134a and 134b. The arc-shaped guide 134a and the arc-shaped guide 134b have the same center of curvature located on the second axis A2 (illustrated in FIG. 6A), and they have the same radius of curvature and are connected to each other. The second rotation component 138 has two convex portions 138e and 138f, and the two convex portions 138e and 138f are disposed slidably to the two arc-shaped guides 134a and 134b respectively. The mutual cooperations between the arc-shaped guides 134a and 134b and the convex portions 138e and 138f make the first rotation component 136 and the second bracket 134 connected rotatably to each other by taking the second axis A2 as a rotation axis.

Specifically speaking, the two arc-shaped guides 134a and 134b each have different depths. The arc-shaped guide having a less depth 134b is divided into two sections 134b1 and 134b2, and the arc-shaped guide having a greater depth 134a is connected between the two sections 134b1 and 134b2 and has two opposing closed ends, and an end of each of the sections 134b1 and 134b2 is open. The two convex portions 138e and 138f together form a ladder-shaped structure and may be disposed slidably respectively to the two arc-shaped guides 134a and 134b having different depths, such that the second rotation component 138 and the second bracket 134 may be disposed slidably against each other in a firm way. Moreover, with the configuration described above, the convex portion 138e disposed slidably to the arc-shaped guide 134a may restrict the predetermined relative operation range of the second rotation component 138 and the second bracket 134 by blockages provided by the two closed ends of the arc-shaped guide 134a. And the open end of each of the sections 134b1 and 134b2 allows the convex portion 138f to move partially out of the arc-shaped guide 134b along with the relative rotation of the second rotation component 138 and the second bracket 134, ensuring that the second rotation component 138 and the second bracket 134 have a sufficient space for the relative operation range (that is, the predetermined relative operation range).

Moreover, the hinge structure 130 further includes at least one torque-providing element 135. The torque-providing element 135 is disposed on the second rotation component 138 and contacts the second bracket 134 to provide the required torque between the second rotation component 138 and the second bracket 134. Specifically speaking, the second bracket 134 has a rod portion 134c, and the rod portion 134c extends along the second axis A2 (illustrated in FIG. 4). The torque-providing element 135 is a covering torque claw and has a covering portion 135a, and the covering portion 135a covers the rod portion 134c to generate torque. In other embodiments, the torque-providing element 135 may be in other suitable forms, and the disclosure is not limited thereto. In addition, in other embodiments, the first bracket 132, the first rotation component 136, the second rotation component 138, and the second bracket 134 may be connected rotatably to one another in sequence in other suitable ways, and the disclosure is not limited thereto.

In sum, in the hinge structure of the disclosure, the two bodies may be driven to rotate relatively to each other and become flattened and stand tightly against each other via the first bracket rotating relative to the first rotation component along the first axis and the second rotation component rotating relative to the first rotation component along the first axis. When the two bodies are flattened and stand tightly against each other, the two bodies cannot continue to rotate along the first axis due to structural interference. In light of this, the disclosure designs the two bodies to rotate smoothly relative to each other and become reversely folded via the second rotation component rotating relative to the second bracket along the second axis which is different from the first axis. In other words, the design of the disclosure not only allows the two bodies to stand tightly against each other when flattened but also allows the two bodies to rotate further to be reversely folded, fitting even more to the user's need in terms of operation.

What is claimed is:
1. An electronic device, comprising:
   two bodies; and
   at least one hinge structure, comprising:
   a first bracket;

a second bracket, wherein the at least one hinge structure is connected to the two bodies respectively via the first bracket and the second bracket;

a first rotation component, connected rotatably to the first bracket by taking a first axis as a rotation axis, and configured to rotate relative to the second bracket; and a second rotation component, connected rotatably to the first rotation component by taking the first axis as a rotation axis, and connected rotatably to the second bracket by taking a second axis as a rotation axis, wherein the first axis and the second axis are parallel to each other and are not coincident, and the second axis is a center of rotation of the second rotation component with respect to the second bracket.

2. The electronic device according to claim 1, wherein a quantity of the at least one hinge structure is two, the two first brackets of the two hinge structures are connected respectively to the two bodies, and the two second brackets of the two hinge structures are connected to each other.

3. The electronic device according to claim 2, wherein when the two bodies are closed, each of the first brackets is adapted to rotate relative to the corresponding first rotation component by taking the first axis as a rotation axis, such that the two bodies are unfolded relatively at a first angle, then each of the first rotation components is adapted to rotate relative to the corresponding second rotation component by taking the first axis as a rotation axis, such that the two bodies are unfolded relatively at a second angle greater than the first angle, and then each of the second rotation components is adapted to rotate relative to the corresponding second bracket by taking the second axis as a rotation axis, such that the two bodies are unfolded relatively at a third angle greater than the second angle.

4. The electronic device according to claim 3, wherein the first angle is 90 degrees, the second angle is 180 degrees, and the third angle is 360 degrees.

5. The electronic device according to claim 1, wherein one of the first bracket and the first rotation component comprises an arc-shaped guide, a center of curvature of the arc-shaped guide is located on the first axis, the other one of the first bracket and the first rotation component comprises a convex part, and the convex part is disposed slidably to the arc-shaped guide.

6. The electronic device according to claim 5, wherein one of the first bracket and the first rotation component comprises another arc-shaped guide, a center of curvature of the another arc-shaped guide is located on the first axis, the other one of the first bracket and the first rotation component comprises another convex portion, and the another convex portion is disposed slidably to the another arc-shaped guide.

7. The electronic device according to claim 6, wherein the two arc-shaped guides have different radii of curvature.

8. The electronic device according to claim 5, wherein the at least one hinge structure comprises at least one torque-providing element, and the at least one torque-providing element is connected coaxially to the convex portion.

9. The electronic device according to claim 1, wherein one of the first rotation component and the second rotation component comprises an arc-shaped guide, a center of curvature of the arc-shaped guide is located on the first axis, the other one of the first rotation component and the second rotation component comprises a convex portion, and the convex portion is disposed slidably to the arc-shaped guide.

10. The electronic device according to claim 9, wherein one of the first rotation component and the second rotation component comprises another arc-shaped guide, a center of curvature of the another arc-shaped guide is located on the first axis, the other one of the first rotation component and the second rotation component comprises another convex portion, and the another convex portion is disposed slidably to the another arc-shaped guide.

11. The electronic device according to claim 10, wherein the two arc-shaped guides have different radii of curvature.

12. The electronic device according to claim 9, wherein the at least one hinge structure comprises at least one torque-providing element, and the at least one torque-providing element is connected coaxially to the convex portion.

13. The electronic device according to claim 1, wherein one of the second rotation component and the second bracket comprises an arc-shaped guide, a center of curvature of the arc-shaped guide is located on the second axis, the other one of the second rotation component and the second bracket comprises a convex portion, and the convex portion is disposed slidably to the arc-shaped guide.

14. The electronic device according to claim 13, wherein one of the second rotation component and the second bracket comprises another arc-shaped guide, a center of curvature of the another arc-shaped guide is located on the second axis, the other one of the second rotation component and the second bracket comprises another convex portion, and the another convex portion is disposed slidably to the another arc-shaped guide.

15. The electronic device according to claim 14, wherein the two arc-shaped guides have a same radius of curvature and are connected to each other, the two arc-shaped guides each have different depths, and the two convex portions together form a ladder-shaped structure and may be disposed slidably respectively to the two arc-shaped guides.

16. The electronic device according to claim 15, wherein the arc-shaped guide having a less depth is divided into two sections, and the arc-shaped guide having a greater depth is connected between the two sections.

17. The electronic device according to claim 15, wherein an end of each of the sections is open.

18. The electronic device according to claim 1, wherein the at least one hinge structure comprises at least one torque-providing element, and the at least one torque-providing element is disposed to the second rotation component.

19. The electronic device according to claim 18, wherein the second bracket comprises a rod portion, the rod portion extends along the second axis, the at least one torque-providing element comprises a covering portion, and the covering portion covers the rod portion.

* * * * *